United States Patent [19]

Patel et al.

[11] Patent Number: 5,479,449
[45] Date of Patent: Dec. 26, 1995

[54] DIGITAL VSB DETECTOR WITH BANDPASS PHASE TRACKER, AS FOR INCLUSION IN AN HDTV RECEIVER.

[75] Inventors: Chandrakant B. Patel, Hopewell; Allen L. Limberg, Ringoes, both of N.J.

[73] Assignee: Samsung Electronics Co. Ltd., Kyungki-Do, Rep. of Korea

[21] Appl. No.: 237,896

[22] Filed: May 4, 1994

[51] Int. Cl.⁶ .......................... H04L 27/06; H04L 27/02
[52] U.S. Cl. ............................................ 375/316; 375/321
[58] Field of Search .................................. 375/75, 77, 43, 375/80, 94, 98; 455/324, 234.1; 329/304; 327/41

[56] References Cited

U.S. PATENT DOCUMENTS 5,230,011   7/1993   Giels et al. ............................... 371/97

FOREIGN PATENT DOCUMENTS 2244410   11/1991   United Kingdom ...................... 375/75

OTHER PUBLICATIONS

D. W. Rice et al., "Quadrature Sampling With High Dynamic Range," IEEE Transactions on Aerospace and Electronic Systems, vol. AES-18, No. 4, Nov. 1982.

Norm Hurst, "Implementing Hilbert Transforms in the ACTV Research Hardware", Jul. 1, 1988.

Charles Rader, "A Simple Method for Sampling In–Phase and Quadrature Components", IEEE, 1984, pp. 821–824.

Shahid Qureshi, "Timing Recovery for Equalized Partial–Response Systems", IEEE Transactions on Communications, Dec. 1976, pp. 1326–1330.

*Primary Examiner*—Stephen Chin
*Assistant Examiner*—T. Ghebretinsae
*Attorney, Agent, or Firm*—Sughrue, Mion, Zinn, Macpeak & Seas

[57] ABSTRACT

In a radio receiver for receiving vestigial sideband (VSB) signals including symbol codes descriptive of digital signals, HDTV signals being exemplary of such VSB signals, a tuner provides for selecting one of channels at different locations in a frequency band used for transmitting such VSB signals. The tuner also includes mixers for performing plural conversion of the selected channel to a final intermediate-frequency signal, which is digitized by an analog-to-digital converter. A phase tracker, operative on narrow-bandpass filtered portions of the digitized final intermediate-frequency signal centering on its carrier frequency, suppresses an imaginary portion of the final intermediate-frequency signal, arising from multipath distortion or from phase incoherency in local oscillations used during frequency conversion. A digital controlled oscillator in the phase tracker supplies digital descriptions of the carrier wave for the final intermediate-frequency signal to a synchronous detector, which synchronous detector detects the real portion of the digitized final intermediate-frequency signal in accordance with those digital descriptions of the carrier wave.

48 Claims, 8 Drawing Sheets

DIGITAL VSB DETECTOR WITH BANDPASS PHASE TRACKER, AS FOR INCLUSION IN AN HDTV RECEIVER.

The invention relates to the detection of vestigial sideband information in the digital regime, especially as it relates to digital high-definition television (HDTV) signal radio receivers.

BACKGROUND OF THE INVENTION

Vestigial sideband (VSB) signals that are used in certain transmissions of HDTV signal have their natural carrier wave, which would vary in amplitude depending on the percentage of modulation, replaced by a pilot carrier wave of fixed amplitude, which amplitude corresponds to a prescribed percentage of modulation. Such VSB signals will be used in over-the-air broadcasting within the United States, for example, and can be used in cable-casting systems. Digital HDTV signal radio receivers for these signals have been proposed, which are of a type that uses double-conversion in the tuner followed by synchronous detection. A frequency synthesizer generates first local oscillations that are heterodyned with the received television signals to generate first intermediate frequencies (e.g., with 920 MHz carrier). A passive LC bandpass filter selects these first intermediate frequencies from their image frequencies for amplification by a first intermediate-frequency amplifier, and the amplified first intermediate frequencies are filtered by a first surface-acoustic-wave (SAW) filter that rejects adjacent channel responses. The first intermediate frequencies are heterodyned with second local oscillations to generate second intermediate frequencies (e.g., with 41 MHz carrier), and a second SAW filter selects these second intermediate frequencies from their images and from remnant adjacent channel responses for amplification by a second intermediate-frequency amplifier. The response of the second intermediate-frequency amplifier is synchrodyned to baseband with third local oscillations of fixed frequency.

The third local oscillations of fixed frequency are supplied in 0°- and 90°-phasing, thereby implementing in-phase and quadrature-phase synchronous detection procedures. The in-phase synchronous detection result is eight-level coding of digital symbols when HDTV signals are broadcast, and the quadrature-phase synchronous detection result is nominally zero-valued. Separately digitizing in-phase and quadrature-phase synchronous detection results generated in the analog regime presents problems with regard to the synchronous detection results satisfactorily tracking each other after digitizing; quantization noise introduces pronounced phase errors in the complex signal considered as a phasor. This problem is avoided in HDTV signal radio receivers of the type previously proposed by performing the in-phase and quadrature-phase synchronous detection procedures in the digital regime.

By way of example, the in-phase and quadrature-phase synchronous detection procedures are implemented by sampling the response of the second intermediate-frequency amplifier at twice the Nyquist rate of the eight-level coding when digitizing. The successive samples are considered to be consecutively numbered in order of their occurence; and odd samples and even samples are separated from each other to generate respective ones of the in-phase (or real) and quadrature-phase (or imaginary) synchronous detection results.

The eight-level coding in the digital in-phase synchronous detection result is filtered to remove co-channel interference from NTSC signals and is subjected to equalization filtering. The equalization filter response is supplied as input signal to a trellis decoder. The response of the trellis decoder is supplied as input signal to a data de-interleaver, and the de-interleaved data are supplied to a Reed-Solomon decoder. Error-corrected data are supplied to a data de-randomizer which regenerates packets of data for a packet decoder. Selected packets are used to reproduce the audio portions of the HDTV program, and other selected packets are used to reproduce the video portions of the HDTV program.

To implement the synchrodyning used in the in-phase and quadrature-phase synchronous detection procedures, the quadrature-phase synchronous detection results are used to develop automatic-frequency-and-phase-control (AFPC) signals for a controlled oscillator that generates the second local oscillations. The digital quadrature-phase synchronous detection result is low-pass filtered to generate an AFPC signal that adjusts the frequency and phase of the second local oscillations to minimize the amplitude of the quadrature-phase synchronous detection result. In practice however, this automatic frequency and phase control is inadequate in providing the desired degree of phase stability for the in-phase synchronous detection result. The adaptive equalization filtering of the digitized in-phase synchronous detection result can correct for static phase error in the synchrodyning used in the in-phase and quadrature-phase synchronous detection procedures, but the adaptative change in the filter coefficients of the equalization filtering is too slow to compensate for phase jitter in the AFPC feedback loop or for changes in phase error that occur during rapid changes in multipath reception of the HDTV signal.

Accordingly, in HDTV signal radio receivers of the type previously proposed, a phase tracker has been cascaded with the equalization filtering of the digitized in-phase synchronous detection result. The equalized in-phase synchronous detection result is supplied in digitized form to a Hilbert-transform finite-impulse-response filter. The response of this FIR filter and the equalized in-phase synchronous detection, as delayed to compensate for the latency of the Hilbert-transform FIR filter, are applied as real and imaginary input signals to a complex-number multiplier, to be multiplied by a complex-number multiplier signal for generating a complex-number product. A feedback loop ascertains the departure of the imaginary component of the complex-number product from zero to develop an error signal for adjusting the phase angle of the unit Euler vector used as the complex-number multiplier signal. The real and imaginary values of the unit Euler vector are drawn from a sine/cosine look-up table (LUT) stored in read-only memory (ROM) addressed by the output of an accumulator used for integrating the error signal. A problem with this phase tracker is that the Hilbert-transform FIR filter has to have many, many taps in order to provide the requisite 90° of phase shift at close to zero frequencies.

The inventors modify the HDTV signal radio receivers described above so the second local oscillations, which are heterodyned with the first intermediate frequencies to convert them to second intermediate frequencies, are of a fixed frequency. Accordingly, phase jitter in the AFPC feedback loop of a controlled oscillator is eliminated as a problem in the generation of the second local oscillations. The second local oscillations are at a fixed frequency offset from the frequency of the carrier for the second intermediate frequencies. The second local oscillations therefore heterodyne with the first intermediate frequencies to downconvert them to second intermediate frequencies, rather than synchrodyning with the first intermediate frequencies to downconvert them to baseband. The second intermediate frequencies are then digitized with a bandpass, rather than baseband, analog-to-digital converter; and the rest of the detection procedures are carried out in the digital regime. The second intermediate frequencies will still exhibit changes in phase error that occur during rapid changes in multipath reception of the HDTV signal, so a phase tracker is still desirable. The phase tracker is implemented at the second intermediate frequencies during complex synchronous detection, and is therefore implemented before equalization filtering, rather than the phase tracker being implemented after complex synchronous detection and equalization filtering as in the prior-art receiver. The phase tracker is a bandpass phase tracker, rather than the baseband (or lowpass) phase tracker used in the prior-art receiver.

The in-phase and quadrature-phase sampling procedures used in the bandpass phase tracker are adapted from ones previously used for complex synchronous detection of digitized bandpass signals having symmetrical sideband structures. HDTV signals for over-the-air broadcasting are vestigial sideband (VSB) amplitude-modulation signals, rather than double sideband (DSB) amplitude-modulation signals, and have asymmetrical sideband structures. The complex synchronous detection of the HDTV signals, used for developing error signal in the bandpass phase tracker, must be sufficiently restricted in bandwidth that response is to a symmetrical sideband structure contained within the asymmetrical sideband structure of the VSB signal. The synchronous detection of the HDTV signals to recover the eight-level (or 16-level) VSB coding is not so restricted in bandwidth.

The in-phase and quadrature-phase sampling procedures used in the bandpass phase tracker are generally similar to those described by D. W. Rice and K. H. Wu in their article "Quadrature Sampling with High Dynamic Range" on pp. 736–739 of IEEE TRANSACTIONS ON AEROSPACE AND ELECTRONIC SYSTEMS, Vol. AES-18, No. 4 (Nov 1982), for example. Rice and Wu point out that the bandpass signals need to be sampled before digitization at or above the Nyquist rate, as determined by the bandwidth of the bandpass signal and not by the highest frequency component of the bandpass signal. Quadrature-phase synchronous detection is performed using a Hilbert-transform FIR filter on the digitized bandpass signals; in-phase synchronous detection is performed after compensating delay equal to the latency time of the Hilbert-transform FIR filter. Rice and Wu point out that performing complex synchronous detection on digitized bandpass signals has the advantage that the direct components introduced by the mixer are suppressed by the bandpass filter and do not affect digitization. In the complex synchronous detection of digitized VSB signals in bandpass form, the direct component of the complex synchronous detection result arising from the partially suppressed carrier wave is unaffected by the direct components introduced by the mixer, which is important in the inventions disclosed herein.

At the time of making their inventions the inventors were aware of advantages in Hilbert transforming digitized bandpass signals, rather than digitized baseband signals, other than the advantages disclosed by Rice and Wu. The Hilbert-transform FIR filter no longer has to provide 90° of phase shift at close to zero frequencies, where very long delay is required for providing 90° of phase shift. The Hilbert-transform FIR filter only has to provide 90° of phase shift above a megahertz or two, where delay requirements are modest, up to a frequency of seven to eight megahertz. The relatively small ratio between the uppermost response frequency and the lowermost response frequency required of the filter keeps the number of taps required in the filter relatively low.

SUMMARY OF THE INVENTION

The invention is embodied in a radio receiver for receiving VSB signals including symbol codes descriptive of digital signals, HDTV signals being exemplary of such VSB signals. A tuner provides for selecting one of channels at different locations in a frequency band used for transmitting the VSB signals. The tuner also includes mixers for performing plural conversion of the selected channel to a final intermediate-frequency signal, which has lowest frequencies substantially above zero frequency and is digitized by an analog-to-digital converter. A phase tracker, operative on narrow-bandpass filtered portions of the digitized final intermediate-frequency signal centering on its carrier frequency, suppresses an imaginary portion of said final intermediate-frequency signal, arising from multipath distortion or from phase incoherency in local oscillations used during frequency conversion(s). A digital controlled oscillator in the phase tracker supplies digital descriptions of the carrier wave for a real portion of the final intermediate-frequency signal to a synchronous detector, which synchronous detector detects the real portion of the digitized final intermediate-frequency signal in accordance with those digital descriptions of the carrier wave.

A further aspect of the invention is automatic gain control (AGC) circuitry for the intermediate-frequency amplifiers of a radio receiver for receiving VSB signals, which AGC circuitry responds to the narrow-bandpass filtered portions of the digitized final intermediate-frequency signal.

In the block schematic diagrams clock or control signal connections are shown in dashed line, where it is desired to distinguish them from connections for the signals being controlled.

DETAILED DESCRIPTION

Figure 1:
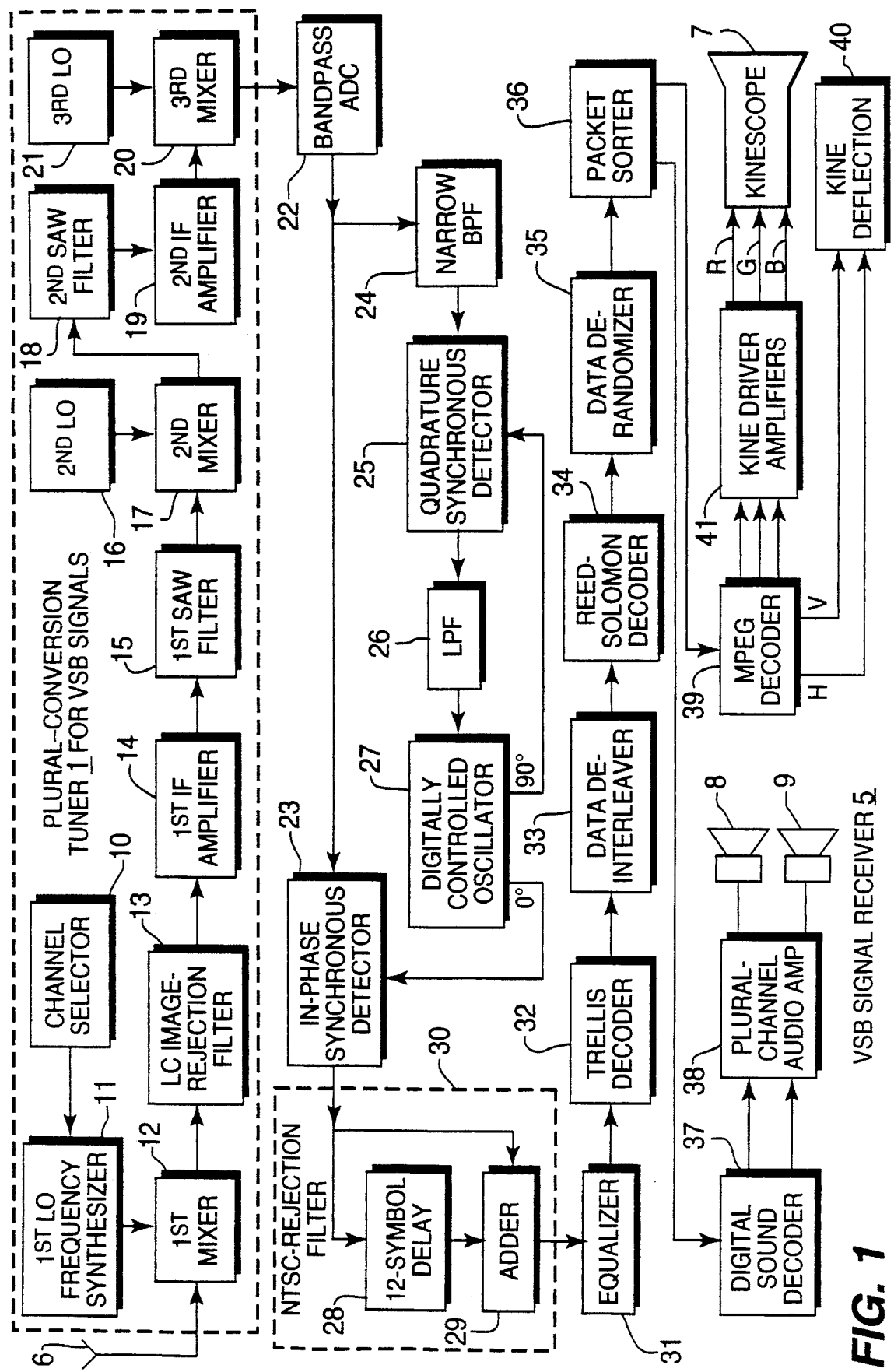
FIG. 1 is a block schematic diagram of a receiver for VSB signal with a pilot carrier component, which receiver is constructed in accordance with the invention for receiving digital HDTV signals.

FIG. 1 shows a VSB signal receiver 5 for receiving digital HDTV signals from a broadcast receiving antenna 6. This receiver 5 recovers red (R), green (G) and blue (B) drive signals for a kinescope 7 and recovers stereophonic sound signals for driving left and right loudspeakers 8 and 9. Alternatively, the VSB signal-receiver 5 can be connected for receiving digital HDTV signals from a narrowcast receiving antenna or from a cablecast transmission system. A different display device may be used instead of the kinescope 7, and the sound recovery system may be different, consisting of but a single audio channel or being more elaborate than a simple stereophonic reproduction system.

A tuner 1 comprising elements 11–21 selects one of channels at different locations in the frequency band for the received VSB signals, such as the digital HDTV signals captured by the broadcast receiving antenna 6, and performs plural frequency conversion of the selected channel to a final intermediate-frequency signal in a final intermediate-frequency band. More particularly, a channel selector 10 designed for operation by a human being determines the frequency of first local oscillations that a frequency synthesizer 11, which functions as a first local oscillator, furnishes to a first mixer 12 for heterodyning with received signals as supplied from the broadcast receiving antenna 6 or other digital HDTV signal source. The first mixer 12 upconverts the received signals in the selected channel to prescribed first intermediate frequencies (e.g., with 920 MHz carrier) and an LC filter 13 is used to reject the unwanted image frequencies that accompany the upconversion result supplied from the first mixer 12. The first intermediate frequencies resulting from the upconversion are supplied as input signal to a first intermediate-frequency amplifier 14, which supplies amplified first intermediate frequencies for driving a first surface-acoustic-wave (SAW) filter 15. The upconversion to the rather high-frequency first intermediate frequencies facilitates SAW filtering having a large number of poles and zeroes. Second local oscillations from a second local oscillator 16 are supplied to a second mixer 17 for heterodyning with the response of the first SAW filter 15, to generate second intermediate frequencies (e.g., with 41 MHz carrier). A second SAW filter 18 is used for rejecting the unwanted image frequencies that accompany the upconversion result supplied from the second mixer 17. The response of the second SAW filter 18 is supplied as input signal to a second intermediate-frequency amplifier 19, the amplified second intermediate-frequency signal response of which is supplied as input signal to a third mixer 20 there to be heterodyned with oscillations from a third local oscillator 21. The plural-conversion tuner 1 as thusfar described resembles those previously proposed by others, except that the frequency of the oscillations from the third local oscillator 21 is chosen such that the third mixer 20 supplies a third intermediate-frequency signal response with the vestigial sideband extending down to a frequency of one to two MHz and with the full sideband extending up to a frequency of seven to eight MHz, rather than a baseband signal with zero-frequency carrier as previously proposed. This third intermediate-frequency signal response is the final intermediate-frequency output signal of the tuner 1.

An analog-to-digital converter (ADC) 22 samples the final intermediate-frequency output signal of the tuner 1, the duration of each of the analog samples being no longer than a half cycle of the highest final intermediate frequency so as to avoid undesirable aliasing, and digitizes the samples to digital samples having 10-bit resolution, or so. The lowpass filter that is included, per customary practice, in the ADC 22 suppresses the high-frequency image of the third intermediate-frequency signal response from the third mixer 20. The second SAW filter 18 has already restricted the bandwidth of the third intermediate-frequency signals presented to the ADC 22 to be digitized, so the ADC 22 functions as a bandpass analog-to-digital converter. The sampling rate used by the ADC 22 during digitization is at least the Nyquist rate for the bandwidth of the bandpass signal, which is 6 MHz for HDTV signals. In practice the inventors prefer a sampling rate of twice the symbol rate for the VSB HDTV signals or about $21.10^6$ samples per second. Sampling at twice the symbol rate for the VSB HDTV signals is done to accommodate circuitry for synchronizing the sampling by the ADC 22 with the symbol rate, so as to maximize the "eye" response. Such circuitry is not explicitly shown in FIG. 1, but appropriate circuitry will be described further on in this specification with reference to FIG. 11 of the drawing.

The in-phase synchronous detector 23 responds to the digitized final intermediate-frequency output signal of the ADC 22, to supply a response corresponding to the received VSB signal as converted to baseband with a zero-frequency carrier. The digital filter 24 is of finite-impulse-response (FIR) type and has a symmetrical kernel, so the filter 24 is phase linear. The response of the bandpass filter 24 is centered on the carrier wave frequency and is narrow enough in bandwidth that the modulation of the carrier wave is suppressed respective to the carrier wave itself in the response. This very narrow bandpass filtering and the automatic gain control in the tuner 1 (not explicitly shown in FIG. 1) cause the pilot carrier wave recovered in the response of the narrow bandpass filter 24 to be of controlled amplitude. The sideband structure giving rise to the filter 24 response is symmetrical in nature with respect to carrier wave frequency. The filter 24 response is supplied to a quadrature-phase synchronous detector 25. The response of the synchronous detector 25 is applied to a lowpass filter 26, the response of which is used for automatic-frequency-and-phase-control (AFPC) of a digitally controlled oscillator (DCO) 27. A digitally controlled oscillator is also known as a "numerically controlled oscillator". The DCO 27 supplies digital (cosine) description of in-phase carrier wave to the in-phase synchronous detector 23, which detector is essentially a digital multiplier for multiplying the response of the ADC 22 by the digitized in-phase carrier wave supplied from the DCO 27. The DCO 27 also supplies digital (sine) description of quadrature-phase carrier wave to the quadrature-phase synchronous detector 25, where it is compared to the pilot carrier wave selected by the narrow bandpass filter 24 to develop an error signal in the feedback loop used for AFPC of the DCO 27. The lowpass filter 26 suppresses carrier wave harmonics in the error signal from the quadrature-phase synchronous detector 25. These harmonics are generated when the quadrature-phase synchronous detector 25 is essentially only a digital multiplier for multiplying the response of the narrow bandpass filter 24 by the digitized quadrature-phase carrier wave supplied from the DCO 27. In actual practice there is some delay or latency in the response of the narrow bandpass filter 24 to its input signal, and this delay is compensated for in the operation of the in-phase synchronous detector 23 by means not explicitly shown in FIG. 1. For example, delay equal to the latent delay of the filter 24 can be inserted in the connection applying the digitized final IF signal from the ADC 22 to the in-phase synchronous detector 23 as input signal.

In the VSB signal receiver 5 of FIG. 1 the baseband response of the in-phase synchronous detector 23 is applied as input signal to a clocked delay line 28 and as a first summand input signal to a two-input digital adder 29. The clocked delay line 28 supplies a response to its input signal after a delay equal to twelve symbol epochs, which delayed response is applied to the digital adder 29 as its second summand input signal. The clocked delay line 28 and the digital adder 29 cooperate to provide an NTSC-rejection filter 30 for suppressing co-channel interference from NTSC signals. The NTSC-rejection filter 30, which is a comb filter, is required as long as NTSC signals are being transmitted over the same channel allocations as digital HDTV signals. The filter 30 suppresses the NTSC luminance carrier and its lower-frequency sidebands containing synchronizing information, very strongly rejects the color subcarrier, suppresses the chrominance sidebands, and suppresses the FM audio carrier. The filter 30 supplies a fifteen-coding-level signal to an equalizer 31 in response to the eight-coding-level digital in-phase synchronous detection result from the detector 23. Though not explicitly shown the input signal to the equalization filter 31 is decimated 2:1 to reduce sample rate to symbol rate. The equalization filter response is supplied from the equalizer 31 as input signal to a trellis decoder 32, which performs the symbol decoding that recovers the digital data stream. The equalizer 31 provides equalization filtering that generates an adjusted amplitude response to the plural-level coding as applied to the trellis decoder 32, which adjusted amplitude response minimizes symbol error resulting from inter-symbol interference.

Although not explicitly shown in FIG. 1, preferably circuitry is provided in the VSB signal receiver 5 to sense when there is co-channel interference from NTSC signal, to by-pass the filter 30 when no co-channel interference from NTSC signal is sensed, and to adjust symbol decoding ranges in accordance with the number of coding levels to be expected. There is less likelihood of the occurence of erroneous decisions as to symbol identity when eight coding levels have to be discerned than when fifteen coding levels have to be discerned. Although data synchronization circuitry is not explicitly shown in FIG. 1, one skilled in the digital HDTV art will understand that the VSB signal receiver 5 includes circuitry for determining when data fields and data lines occur to provide the basis for timing data de-interleaving. Data field synchronization circuitry takes its input signal from the output port of the equalizer 31, supposing the equalizer 31 is of the type preferred by the inventors, which type makes feedback adjustments of amplitude response dependent on the response of the equalizer 31 to a ghost-cancellation reference signal. The beginning of data fields are signalled by a pseudo-random pulse train that serves as a ghost-cancellation reference signal for the equalizer 31. Data line synchronization circuitry that detects the occurences of the symbol code sequence signalling the beginning of data lines as they occur in the equalizer 31 response, rather than as they occur in the equalizer 31 input signal, is preferred by the inventors. Such data line synchronization circuitry can use the same circuitry for deciding coding levels as the trellis decoder 32 uses for symbol decoding.

The data response of the trellis decoder 32 is supplied as input signal to a data de-interleaver 33, and the de-interleaved data are supplied from the data de-interleaver 33 to a Reed-Solomon decoder 34. Error-corrected data are supplied from the Reed-Solomon decoder 34 to a data de-randomizer 35 which regenerates packets of data for a packet sorter 36. The packet sorter 36 sorts packets of data for different applications, responsive to header codes in the successive packets of data. Packets of data descriptive of the audio portions of the HDTV program are applied by the packet sorter 36 to a digital sound decoder 37. The digital sound decoder 37 supplies left-channel and right-channel stereophonic sound signals to a plural-channel audio amplifier 38 that drives the plurality of loudspeakers 8, 9. Packets of data descriptive of the video portions of the HDTV program are applied by the packet sorter 36 to an MPEG decoder 39. The MPEG decoder 39 supplies horizontal (H) and vertical (V) synchronizing signals to kinescope deflection circuitry 40 that provides for the raster scanning of the viewing screen of the kinescope 7 or other display device. The MPEG decoder 39 also supplies signals to the kinescope driver amplifiers 41 for applying amplified red (R), green (G) and blue (B) drive signals to the kinescope 7 or other display device.

The response of the narrow bandpass filter 24 can be supplied to an absolute-value circuit, the resulting rectified signal can then be digitally lowpass filtered, and the resulting lowpass filter response can then be converted to analog form to provide an automatic gain control (AGC) signal for controlling the gains of one or both the IF amplifiers 14 and 18. This will regulate the amplitude of the digitized carrier wave selected by the narrow bandpass filter 24 as its response.

In variants of the VSB signal receiver 5 of FIG. 1, the response of the narrow bandpass filter 24 is symmetrically clipped to generate digital representations of a square wave. This can be done as follows, presuming the filter 24 to be in two's complement arithmetic. The most significant bit of the multiple-bit filter 24 response is preserved as the more significant bit of the two-bit ternary response of the digital symmetrical clipper, and the less significant bits of the multiple-bit filter 22 response are ORed to generate the less significant bit of the two-bit ternary response of the digital symmetrical clipper.

The lowpass filter 24 for AFPC signals can be somewhat cumbersome to implement in an all-digital controlled oscillator design and introduces delay into the response of the feedback loop controlling the frequency and phase of DCO 27 output signal. Further, the feedback loop can repose in an undesired conditionally stable condition rather than in a desired unconditionally stable condition. In preferred embodiments of the invention, then, the use of simple digital multipliers for carrying out in-phase and quadrature-phase synchronous detection solely on real signals is eschewed in favor of carrying out in-phase and quadrature-phase synchronous detection on complex signals. The in-phase and quadrature-phase sampling techniques described by Rice and Wu are adapted for use in the synchronous detection of the VSB signals. Performing the in-phase and quadrature-phase synchronous detection using complex variables eliminates the generation of carrier harmonics in the synchronous detection results.

Figure 2:
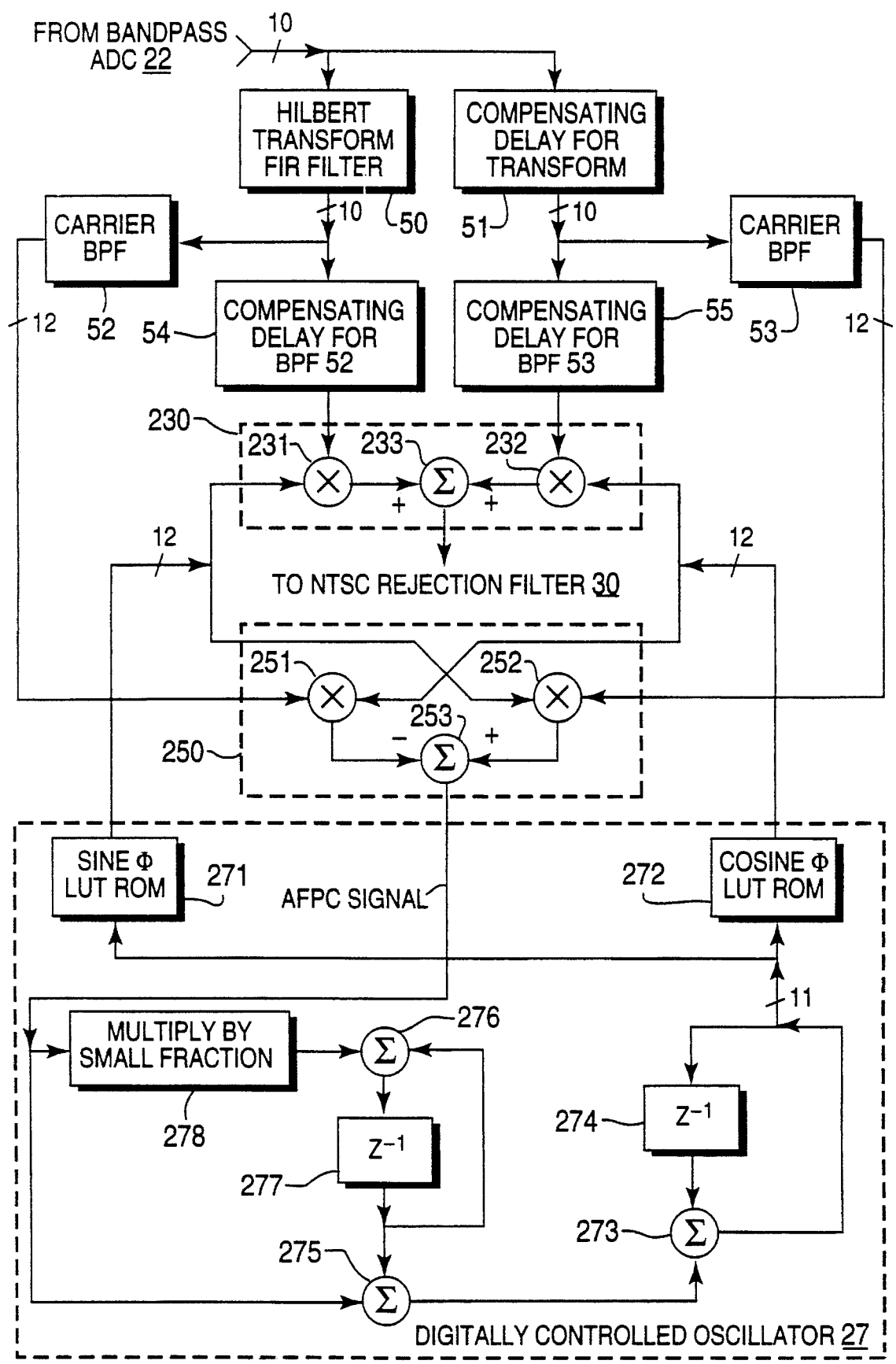
FIGS. 2, 3, 4, and 5 are block schematic diagrams of different configurations that modifications of the synchronous detection circuitry of FIG. 1 can take in various specific embodiments of the invention.

FIG. 2 shows modified apparatus for carrying out the synchronous detection of VSB signals in another embodiment of the invention. The digitized final IF signal from the analog-to-digital converter 22 is supplied as input signal to an FIR digital filter 50 providing a Hilbert transform of the third mixer 20 response. The digitized final IF signal from the ADC 22 is also supplied as input signal to a digital delay line 51, which delay line 51 provides compensating delay equal to the latency of the digital filter 50. The responses of the digital filter 50 and of the digital delay line 51 are supplied as input signals to carrier bandpass filters 52 and 53, respectively. The filters 52 and 53, which have identical bandpass characteristics, separate the complex pilot carrier wave from the sidebands of the carrier wave modulated in accordance with the 8-level VSB coding in the complex signal formed by the responses of the the digital filter 50 and of the digital delay line 51. The responses of the digital filter 50 and of the digital delay line 51 are supplied as input signals to digital delay lines 54 and 55, which provide respective compensating delays equal to the latency times of carrier bandpass filters 52 and 53, respectively.

An in-phase synchronous detector 230 for the complex signal supplied from the digital delay lines 54 and 55 comprises digital multipliers 231 and 232 for multiplying the responses supplied from the delay lines 54 and 55 by the sine and the cosine of the carrier wave, respectively, and a digital adder 233 for summing the product signals from the digital multipliers 231 and 232. Since it is known in advance that the imaginary term of the complex product will invariably be zero-valued, or substantially so, the digital multipliers and subtractor that would be required to generate the imaginary term are dispensed with. The in-phase synchronous detector 230 output signal, which is supplied as the sum signal from the adder 233, is applied to the NTSC-rejection filter 26 as its input signal.

A quadrature-phase synchronous detector 250 includes comprises digital multipliers 251 and 252 for multiplying the responses of the carrier bandpass filters 52 and 53 by the cosine and the sine of the carrier wave, respectively, and a digital subtractor 253 for subtracting the product signal of the digital multiplier 251 from the product signal of the digital multiplier 252. That is, the complex digital description of separated pilot carrier wave furnished by the carrier bandpass filters 52 and 53 is multiplied by the complex digital description of the quadrature-phase carrier wave. Since it is known in advance that the real term of the complex product will invariably be zero-valued, or substantially so, the digital multipliers and adder that would be required to generate the real term are dispensed with. The difference output signal from the subtractor 253 provides an AFPC signal to the DCO 27.

The digital controlled oscillator 27 shown in FIG. 2 comprises a carrier wave sine Φ look-up table in read-only memory 271 for supplying 12-bit multiplicands to the digital multipliers 231 and 252, a carrier wave cosine Φ look-up table in read-only memory 272 for supplying 12-bit multiplicands to the digital multipliers 232 and 251, and a ROM address generator for the ROMs 271 and 272. This address generator includes a two-input digital adder 273 supplying the ROM addresses to the ROMs 271 and 272 as its sum output signal and a clocked one-sample delay element 274 for applying that sum output signal to a first summand input of the adder 273 to complete an accumulator for the ROM addresses. A two-input digital adder 275 supplies its sum output signal to the second summand input of the adder 273 for incrementing the ROM address accumulation each system clock cycle. The plural-conversion tuner 1 preferably heterodynes the carrier of the VSB signal to the lower-frequency portion of the band of final IF signal frequencies supplied to the ADC 22, rather than the higher-frequency portion of that band, because the sine Φ and cosine Φ multiplicands are then supplied from the ROMs 271 and 272 with a greater number of samples per $2\pi$ radians of $\phi$, which provides higher angular resolution in the consecutive carrier wave samples.

In the absence of error in the oscillations of the DCO 27, as supplied in quadrature-related phasings from the ROMs 271 and 272, the sum output signal from the subtractor 253 that is supplied as AFPC error signal will be zero-valued. The sum output signal from the subtractor 253 is supplied to a first summand input of the adder 275, but being zero-valued will have no effect on the sum output signal from the adder 275. The sum output signal from the adder 275 will be the same as the signal supplied to its second summand input, which is the sum output signal from another digital adder 276 as delayed by one sample by a clocked one-sample delay element 277. The sum output signal from the subtractor 253 is supplied to a digital multiplier 278 as multiplier input signal to multiply a fixed multiplicand, which multiplier input signal being zero causes the product output signal from the digital multiplier 278 to be zero-valued as well. The product output signal from the digital multiplier 278 is supplied to a first summand input of the adder 276, but being zero-valued will have no effect on the sum output signal from the adder 276. The sum output signal from the adder 276 will be the same as the signal supplied to its second summand input, which is the previous-sample value of the sum output signal from the adder 276 as delayed one sample by the clocked one-sample delay element 277. The loop connection of the adder 276 and the clocked one-sample delay element 277 form a circulating-delay-line memory that continues to supply the same increment to the second summand input of the adder 275 and thence to the second summand input of the adder 273, system clock cycle after system clock cycle, as long as the AFPC signal from the sum output of the adder 253 remains zero-valued. The ROM addresses from the sum output of the adder 273 will continuously ramp up in value until overflow occurs to restart the cycle of continuously ramping up those ROM addresses.

When the AFPC signal from the sum output of the adder 253 is positive in value, this is indicative that the oscillations of the DCO 27, as supplied in quadrature-related phasings from the ROMs 271 and 272, are retarded in phase from proper value. The positive AFPC signal is applied to the first summand input of the adder 275, causing its sum output signal to be increased in value from its value when the AFPC signal is zero-valued. This immediately advances, or sets ahead, the point from which the ROM addresses supplied from the sum output of adder 273 ramp up, which ramping up continues to occur owing to the addresses being fed back to the first summand input of the adder 273 through the single-sample delay element 274. The positive AFPC signal is applied as multiplier input signal to the digital multiplier 278 to multiply the fixed multiplicand, which fixed multiplicand is a small fraction, so a small positive product output signal is generated by the digital multiplier 278 for application to the first summand input of the adder 276. This first summand input signal of small value increases the sum output signal from the adder 276, increasing the size of the increment that is stored in the circulating-delay-line memory formed by the loop connection of the adder 276 and the clocked one-sample delay element 277. This larger increment is applied by the clocked one-sample delay element 277 after one sample delay to the second summand input of the adder 275 and thence to the second summand input of the adder 273. This increased increment speeds the rate of address accumulation by the adder 273 and the single-sample delay element 274 feeding back the sum output signal of that adder to its first summand input. The ROM addresses from the sum output of the adder 273 will continuously ramp up in value until overflow occurs to restart the cycle of continuously ramping up those ROM addresses, the ramping up occurring at the increased rate of accumulation until further non-zero value of the AFPC signal further alters the rate of address accumulation.

When the AFPC signal from the sum output of the adder 253 is negative in value, this is indicative that the oscillations of the DCO 27, as supplied in quadrature-related phasings from the ROMs 271 and 272, are advanced in phase from proper value. The negative AFPC signal is applied to the first summand input of the adder 275, causing its sum output signal to be increased in value from its value when the AFPC signal is zero-valued. This immediately retards, or sets back, the point from which the ROM addresses supplied from the sum output of adder 273 ramp up, which ramping up continues to occur owing to the addresses being fed back to the first summand input of the adder 273 through the single-sample delay element 274. The negative AFPC signal is applied as multiplier input signal to the digital multiplier 278 to multiply the fixed multiplicand, which fixed multiplicand is a small fraction, so a small negative product output signal is generated by the digital multiplier 278 for application to the first summand input of the adder 276. This first summand input signal of small value decreases the sum output signal from the adder 276, decreasing the size of the increment that is stored in the circulating-delay-line memory formed by the loop connection of the adder 276 and the clocked one-sample delay element 277. This smaller increment is applied by the clocked one-sample delay element 277 after one sample delay to the second summand input of the adder 275 and thence to the second summand input of the adder 273. This decreased increment slows the rate of address accumulation by the adder 273 and the single-sample delay element 274 feeding back the sum output signal of that adder to its first summand input. The ROM addresses from the sum output of the adder 273 will continuously ramp up in value until overflow occurs to restart the cycle of continuously ramping up those ROM addresses, the ramping up occurring at the decreased rate of accumulation until further non-zero value of the AFPC signal further alters the rate of address accumulation.

Figure 3:
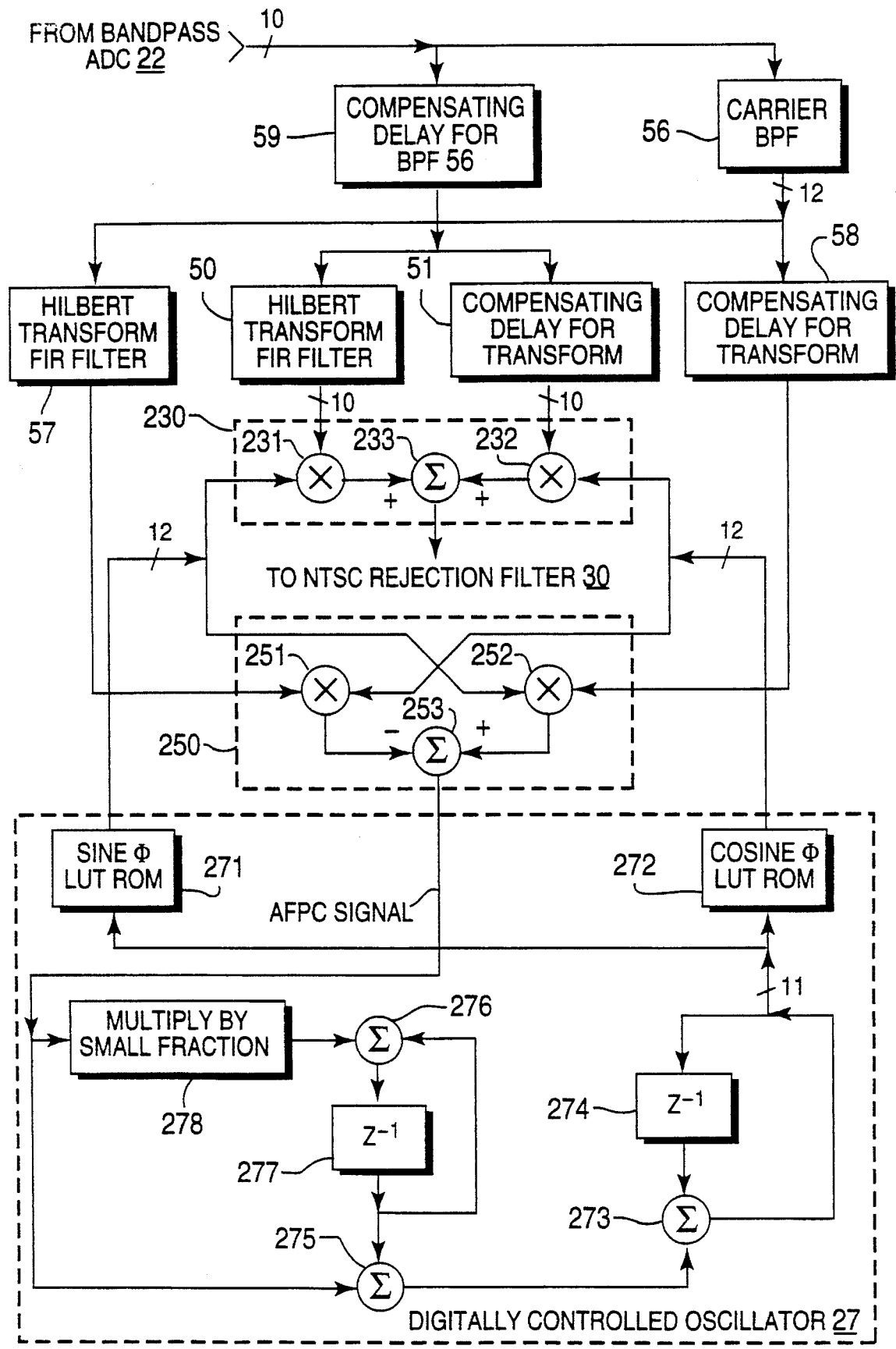

FIG. 3 shows other modified apparatus for carrying out the synchronous detection of VSB signals in another embodiment of the invention, which differs from the FIG. 2 apparatus in the following respects. The carrier bandpass filters 52 and 53 are dispensed with, in favor of a single carrier narrow bandpass filter 56 receiving the digitized final IF signal from the ADC 22 as its input signal and selecting a digitized carrier wave therefrom for its response. The filter 56 response is supplied as input signal to an FIR digital filter 57 providing a Hilbert transform of the filter 56 response. The filter 56 response is also supplied as input signal to a digital delay line 58, which provides compensating delay equal to the latency of the digital filter 56. The connections to the quadrature-phase synchronous detector 250 are altered so that the digital multipliers 251 and 252 multiply the responses of the digital filter 57 and of the digital delay line 58, respectively, rather than the responses of the carrier bandpass filters 52 and 53.

A delayed response to the digitized final IF signal from ADC 22, which delayed response is supplied by a digital delay line 59, is applied as input signal to the FIR digital filter 50 and to the digital delay line 51. The responses of the FIR digital filter 50 and the digital delay line 51 are applied directly to the digital multiplier 231 and to the digital multiplier 232 as their respective multiplicand signals. The digital delay line 59 provides compensating delay for the latency of the carrier bandpass filter 56 in the responses of both the filter 50 and the delay line 51. The single delay line 59 in cascade connection before the filter 50 and the delay line 51 provides the same responses as the two delay lines 54 and 55 connected in respective cascade connections after the filter 50 and the delay line 51, per FIG. 2, do.

Figure 4:
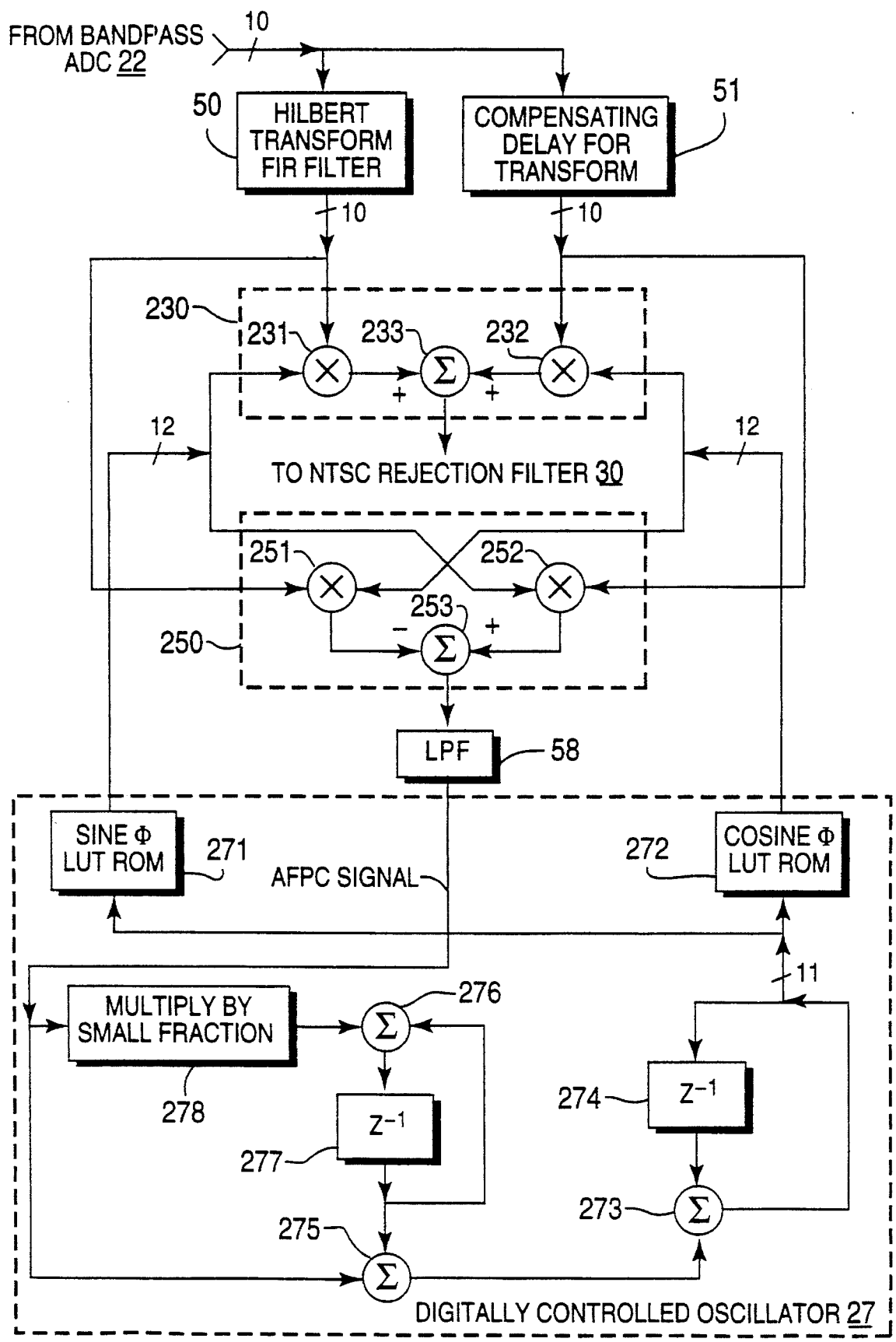

FIG. 4 shows still other modified apparatus for carrying out the synchronous detection of VSB signals in another embodiment of the invention, which differs from the FIG. 2 apparatus in the following respects. The carrier bandpass filters 52 and 53 are each replaced by a respective wired connection. The digital delay lines 54 and 55, which provide respective compensating delays equal to the latency times of carrier bandpass filters 52 and 53 in FIG. 2, are each replaced by a respective wired connection. The quadrature-phase synchronous detector 250 is operated relatively wide-band, with the AFPC signal attributable to the carrier wave being heterodyned to zero or close-to-zero frequency being selected from the sum output signal of the adder 253 using a low-pass digital filter 58. The low-pass filter 58 is chosen to have a cut-off frequency many times lower than symbol rate, so that frequencies associated with groups of successive similar symbols are rejected. The randomization of data as a preliminary step before symbol coding at the transmitter limits the number of successive similar symbols likely to occur, which facilitates lowpass filtering after quadrature-phase synchronous detection to recover AFPC signal. The randomization of data also facilitates bandpass filtering before quadrature-phase synchronous detection to recover AFPC signal per FIG. 2 or 3.

A straightforward variant of the DCO 27 shown in FIGS. 2, 3, and 4 is a DCO in which the two-input adders 273 and 275 are replaced by a single three-input digital adder. A number of tricks relying on symmetries in the sine and cosine functions are known to skilled digital designers for reducing the amount of ROM required for sine $\Phi$ and cosine $\Phi$ table look-up, and the DCO 27 can be modified to use such reduced-ROM designs. Arrangements where the sine $\Phi$ and cosine $\Phi$ signals are not read from ROM, but rather are accumulated in parallel in accordance with the sin (A+B)= sin A cos B+cos A sin B and cos (A+B)=cos A cos B—sin A sin B trigonometric formulae are another DCO arrangement that can be used in modifications of the DCO 27 in further embodiments of the invention.

Figure 5:
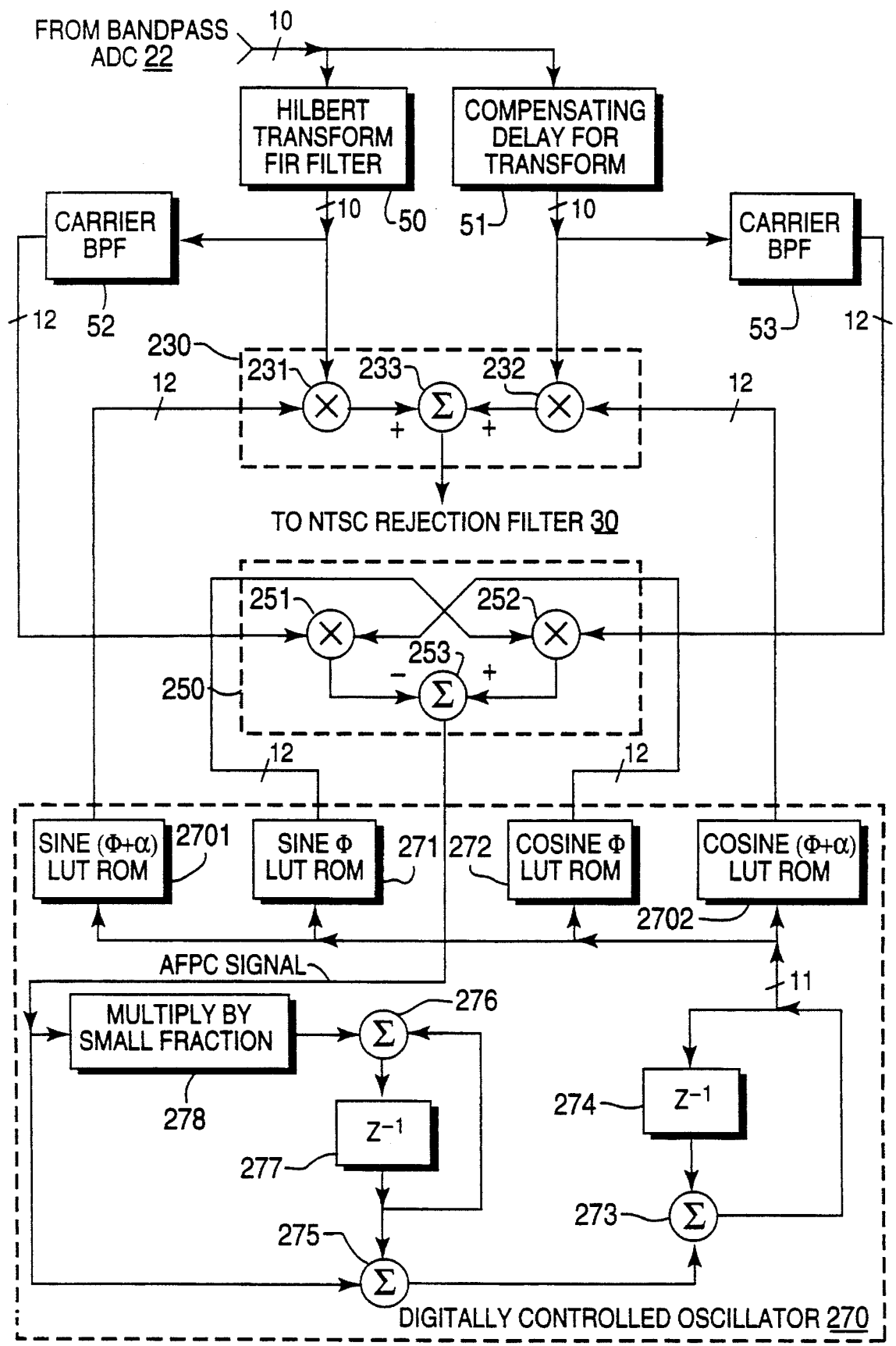

FIG. 5 shows a variant of the apparatuses for carrying out the synchronous detection of VSB signals shown in FIGS. 2 and 3, which variant uses a DCO 270 that differs from the DCO 27 in that it further includes a read-only memory 2701 storing a sin ($\Phi+\alpha$) look-up table and a read-only memory 2702 storing a cos ($\Phi+\alpha$) look-up table. The digital multiplier 231 receives its multiplier signal from the ROM 2701, rather than from the ROM 271; and the digital multiplier 232 receives its multiplier signal from the ROM 2702, rather than from the ROM 272. The digitized final IF signal from the ADC 22 is applied, via a wired connection without substantial delay, as input signal to the Hilbert transform FIR filter 50; and the response of the filter 50 is applied, via a wire connection without substantial delay, to the digital multiplier 231 as its multiplicand input signal. The digitized final IF signal from the ADC 22 is applied, via a wired connection without substantial delay, as input signal to the digital delay line 51; and the response of the delay line 51 is applied, via a wired connection without substantial delay, to the digital multiplier 231 as its multiplicand input signal.

That is, FIG. 5 differs from FIG. 2 in that the delay lines 54 and 55 are replaced by respective wired connections. Instead of using the delay lines 54 and 55 for delaying the multiplicand signals applied to the digital multipliers 231 and 232, the multiplicand signals are advanced in time by taking them from the sin $(\Phi+\alpha)$ and cos $(\Phi+\alpha)$ look-up tables stored in the ROMs 2701 and 2702, rather than from the sin $\Phi$ and cos $\Phi$ look-up tables stored in the ROMs 271 and 272. FIG. 5 differs from FIG. 3 in that the digital delay line 59 is replaced by a wired connection. Instead of using the delay line 59 for delaying the multiplicand signals applied to the digital multipliers 231 and 232, the multiplicand signals are advanced in time by taking them from the sin $(\Phi+\alpha)$ and cos $(\Phi+\alpha)$ look-up tables stored in the ROMs 2701 and 2702. In special cases where $\alpha$ is 90°, the ROMs 2701 and 2702 are not required, of course, since the sin $(\Phi+\alpha)$ and cos $(\Phi+\alpha)$ values are respectively the same as the cos $\Phi$ value read from the ROM 272 and the negative of the sin $\Phi$ value read from the ROM 271.

Although the radio receivers specifically described above for receiving VSB signals including symbol codes descriptive of digital signals use the triple-conversion tuner 1 for developing a third intermediate-frequency signal, as the final intermediate-frequency signal which is subjected to complex synchronous detection, receivers using double-conversion tuners and a bandpass phase tracker of a nature as described above embody the invention in its broader aspects. Radio receivers using only a double-conversion tuner are possible, in which the second intermediate-frequency signal is the final intermediate-frequency signal and is in the same frequency range as the final intermediate-frequency signal of the triple-conversion tuner 1. It is also possible to construct a double-conversion tuner that converts the selected HDTV channel directly to the 30–45 MHz range and then converts the resulting first immediate frequency signal to a final intermediate frequency in the 1–8 MHz range.

The radio receivers specifically described above use a final intermediate-frequency signal the lowest component frequency of which is a megahertz or two above zero frequency. This final intermediate-frequency signal is high enough in frequency that the Hilbert transform FIR filter and compensating delay FIR filter have reasonably short delay and reasonably few taps. This final intermediate-frequency signal is made so low to allow increased duration of the analog-signal samples taken for digitization in the analog to digital converter, which is preferred for the simplification it provides in the construction and operation of the sampler preceding digitization. To avoid undesirable aliasing, the duration of these samples should not exceed a half cycle of the carrier wave at final intermediate frequency. Otherwise, as Rice and Wu point out, the bandpass signals need only to be sampled before digitization at or above the Nyquist rate, as determined by the bandwidth of the bandpass signal and not by the highest frequency component of the bandpass signal.

The use of a sampler that can take shorter duration samples permits the final intermediate frequency to be higher than the 1–8 MHz range. For example, a double-conversion tuner that has a final intermediate frequency of twice HDTV symbol rate, or about 21 MHz, should be possible. Radio receivers for receiving VSB signals including symbol codes descriptive of digital signals, which receivers use a bandpass phase tracker of a nature as described above, embody the invention in its broader aspects even if the lowest component frequency of the final intermediate-frequency signal is substantially higher than one or two MHz.

An AGC range of 60–90 dB is required of the tuner, requiring a plurality of controlled-gain intermediate-frequency amplifier stages. Maintaining phase linearity over a wide range of controlled gain is more easily achieved at frequencies higher than the 1–8 MHz range. So, when the final IF signal is chosen to be in the 1–8 MHz range, it is preferable that the IF amplifiers before the final mixer provide the required AGC range of 60–90 dB. Providing this controlled gain at two frequencies better avoids unwanted regeneration effects, which tend to occur in a high-gain amplifier operating in a single frequency band. The high degree of phase-linearity required of the SAW filtering is easier to achieve at intermediate frequencies higher than the 30–40 MHz range. Accordingly, a triple-conversion tuner is currently preferred.

Figure 6:
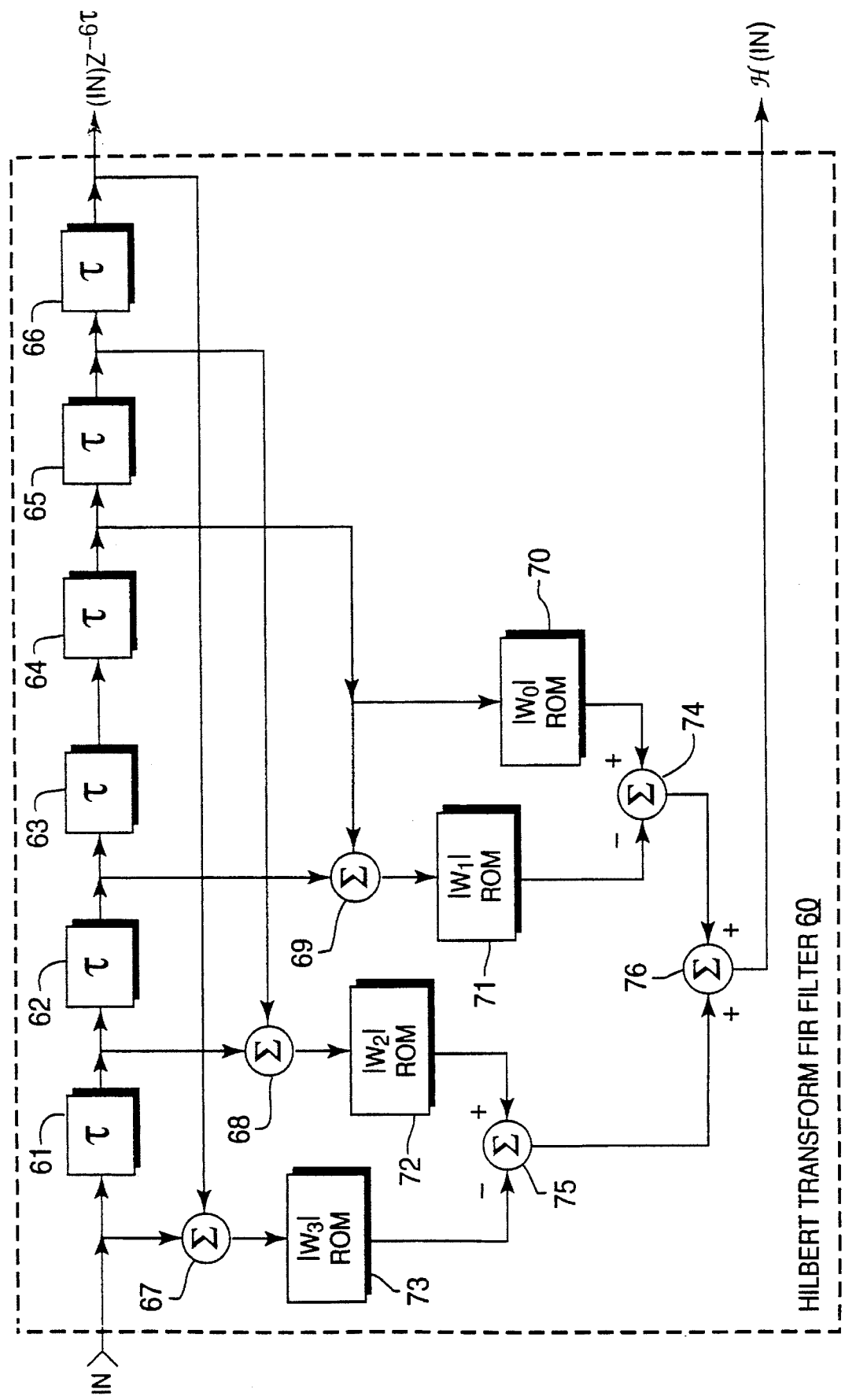
FIG. 6 is a detailed block schematic diagram of a Hilbert transformer FIR filter and compensating delay as can be employed in the synchronous detection circuitry of FIG. 2, 3, 4 or 5.

FIG. 6 shows a seven-tap Hilbert transform FIR filter 60 that can be used instead of either of the Hilbert transform FIR filter 50 or 57. The seven-tap FIR filter 60 includes a cascade connection of one-sample delay elements 61, 62, 63, 64, 65 and 66 for originating the seven differentially delayed input signal samples to be weighted and summed to generate the Hilbert transform response. The Hilbert transform is linear phase in nature so the tap weights of the FIR filter 60 exhibit symmetry about median delay. Accordingly, a digital adder 67 sums the input signal to delay element 61 and the output signal from the delay element 66 to be weighted in common, a digital adder 68 sums the output signal from the delay element 61 and the output signal from the delay element 65 to be weighted in common, and a digital adder 69 sums the output signal from the delay element 62 and the output signal from the delay element 64 to be weighted in common. The output signal from the delay element 64 is applied as input address to a read-only memory 70, which multiplies that signal by an appropriate weight $W_0$ magnitude. The sum output signal from the digital adder 69 is applied as input address to a read-only memory 71, which multiplies that signal by an appropriate weight $W_1$ magnitude. The sum output signal from the digital adder 68 is applied as input address to a read-only memory 72, which multiplies that signal by an appropriate weight $W_2$ magnitude. The sum output signal from the digital adder 67 is applied as input address to a read-only memory 73, which multiplies that signal by an appropriate weight $W_3$ magnitude. The use of the ROMs 70, 71, 72 and 73 as fixed-multiplicand multipliers keeps the delay associated with multiplication negligibly short. The output signals of the ROMs 70, 71, 72 and 73 are combined by a tree of signed digital adders 74, 75 and 76 operated as adders or subtractors, as required to appropriately assign signs to the magnitudes of the weights $W_0$, $W_1$, $W_2$ and $W_3$ stored in the ROMs 70, 71, 72 and 73. The adders 67, 68, 69, 74, 75 and 76 are assumed to be clocked adders each exhibiting one-sample latency, which results in the seven-tap FIR filter 60 exhibiting a six-sample latency. Delay of the filter 60 input signal that compensates for this latency is provided by the cascade connection of the six one-sample delay elements 61, 62, 63, 64, 65 and 66. So, where the filter 60 is used instead of the filter 50, the cascade connection of the delay elements 61, 62, 63, 64, 65 and 66 can be used instead of the delay line 51 separate from the filter 50. Similarly, where the filter 60 is used instead of the filter 57, the cascade connection of the delay elements 61, 62, 63, 64, 65 and 66 can be used instead of the delay line 58 separate from the filter 57. One skilled in the art of digital design will understand how, in variants of the filtering described in this paragraph, the delay structure used for developing samples for weighting and summation to generate a filter function can also be used for forming all or a part of the delay required to compensate for the latency in the filter function.

Other embodiments of the invention are possible in which the in-phase and quadrature-phase sampling procedures used in the bandpass phase tracker are implemented by other types of paired all-pass digital filters that exhibit a constant $\pi/2$ difference in phase response for the digitized bandpass signals. C. M. Rader in his article "A Simple Method for Sampling In-Phase and Quadrature Components", IEEE TRANSACTIONS ON AEROSPACE AND ELECTRONIC SYSTEMS, Vol. AES-20, No. 6 (Nov 1984), pp. 821–824, describes a type of paired all-pass digital filters somewhat simpler to implement than the Hilbert-transform FIR filter and the compensating-delay FIR filter of Rice and Wu. Rader replaces the filters of Rice and Wu with a pair of all-pass digital filters designed using Jacobian elliptic functions. A pair of such all-pass digital filters preferred by Rader has the following system functions:

$$H_1(z)=z^{-1}(z^{-2}-a^2)/(1-a^2z^{-2})\ a^2=0.5846832$$

$$H_2(z)=-(z^{-2}-b^2)/(1-b^2z^{-2})\ b^2=0.1380250$$

Rader describes filter configurations which require only two multiplications, one by $a^2$ and one by $b^2$. Rader's improved circuitry for performing complex synchronous detection of digitized bandpass signals can be adapted for use in alternative embodiments of the invention.

Figure 7:
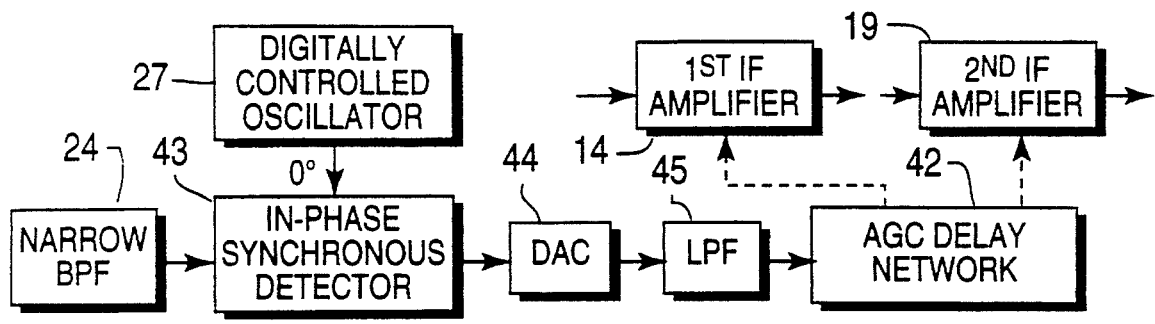
FIG. 7 is a block schematic diagram of an automatic gain control (AGC) arrangement for the FIG. 1 VSB signal receiver.

FIG. 7 shows an arrangement for supplying automatic gain control (AGC) signal to an AGC delay network 42 that supplies gain-control signals to the first IF amplifier 14 and the second IF amplifier 19 of the FIG. 1 VSB signal receiver for controlling their respective gains. The combined operation of the first IF amplifier 14, the second IF amplifier 19 and the AGC delay network 42 is accordance with prior-art practice. What is of particular interest is the way in which the AGC input signal is generated for application to the AGC delay network 42. The AGC delay network 42 may include an AGC signal amplifier for the AGC input signal, but with carefully design the need for such AGC signal amplifier can be avoided. The digital description of pilot carrier wave separated by the narrow bandpass filter 24 is applied as input signal to another in-phase synchronous detector 43 to be heterodyned with the oscillations supplied in 0° phasing from the DCO 27. The in-phase synchronous detector 43 can simply consist of a digital multiplier for multiplying successive terms of the digital description of pilot carrier wave separated by the narrow bandpass filter 24 by corresponding terms of the digital description of the pilot carrier wave in 0° phasing. The digital output signal of the in-phase synchronous detector 43 is converted to an analog signal by the digital-to-analog converter (DAC) 44, and the analog output signal of the DAC 44 is lowpass filtered by a lowpass filter 45 to generate a response, which response is essentially direct in nature, exhibiting changes with time constants of the order of several fields of video. The filter 45 response is applied to the AGC delay network 42 as AGC input signal. The lowpass filter 45 is an analog filter, as may be constructed from resistor-capacitor L-sections. Of interest is the dual use to which the narrow bandpass filter 24 is put, being used in generating an AGC signal as well as in generating an AFPC signal. The continuous nature of the pilot carrier wave recovered by the narrow bandpass filter 24 is advantageous for generating an AGC signal.

Automatic gain control proceeding from narrowband synchronous detection of the double-sideband response of the narrow bandpass filter 24 to pilot carrier wave (using the elements 43, 44 and 45) is substantially unaffected by Johnson noise. The bandpass filter 24 reduces the Johnson noise level respective to pilot carrier as the square root of the ratio of full bandwidth of the final IF signal to the narrower bandwidth of the bandpass filter 24, in addition to the quadrature-phase noise being suppressed by synchronous detection. Automatic gain control that is substantially unaffected by noise is advantageous when performing symbol decoding, since the ranges of digital values associated with particular symbols are better defined. The input signal range the ADC 22 is called upon to digitize must accommodate, without the occurence of significant clipping, reasonable levels of noise at times adding with the controlled-level final IF signal.

Figure 8:
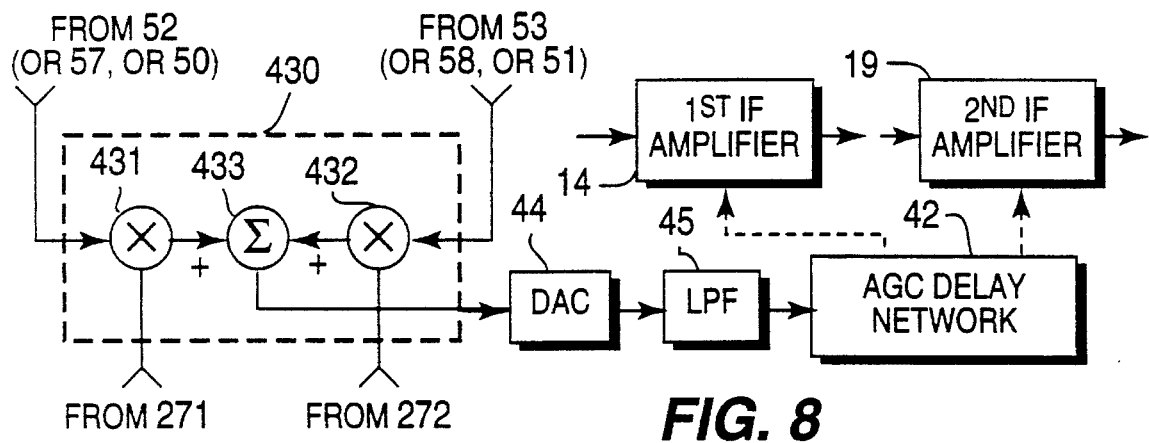
FIG. 8 is a block schematic diagram of an AGC arrangement for the FIG. 1 VSB signal receiver, as modified to use synchronous detection circuitry per FIG. 2, 3, 4 or 5.

FIG. 8 shows an alternative arrangement for supplying AGC signal to the AGC delay network 42 included in a modification of the FIG. 1 VSB signal receiver per FIG. 2, 3, 4 or 5. This arrangement includes another in-phase synchronous detector 430 which comprises: a digital multiplier 431 for multiplying by the sine of the carrier wave the same signal the digital multiplier 251 multiplies by the cosine of the carrier wave, a digital multiplier 432 for multiplying by the cosine of the carrier wave the same signal the digital multiplier 252 multiplies by the sine of the carrier wave, and a digital adder 433 for summing the product signals from the digital multipliers 431 and 432. The digital output signal of the in-phase synchronous detector 430 is converted to an analog signal by the digital-to-analog converter (DAC) 44, and the analog output signal of the DAC 44 is lowpass filtered by a lowpass filter 45 to generate the AGC input signal applied to the AGC delay network 42.

Figure 9:
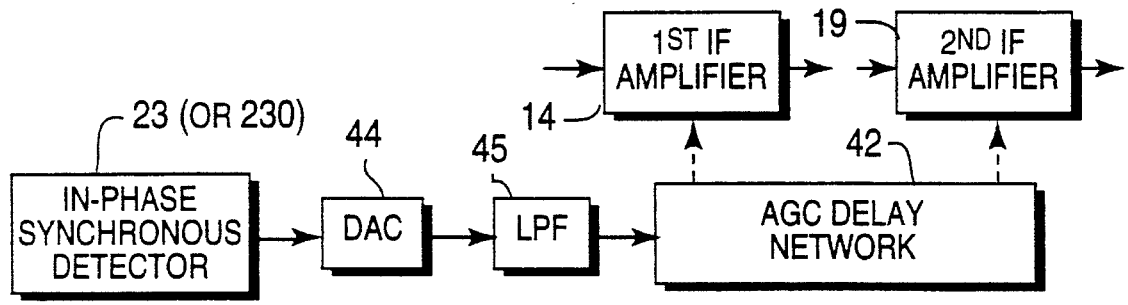
FIG. 9 is a block schematic diagram of still another AGC arrangement for the FIG. 1 VSB signal receiver, or that receiver as modified to use synchronous detection circuitry per FIG. 2, 3, 4 or 5.

FIG. 9 shows an alternative arrangement for supplying AGC signal to the AGC delay network 42 included in the FIG. 1 VSB signal receiver or a modification thereof per FIG. 2, 3, 4 or 5. The DAC 44 is supplied the response of the in-phase synchronous detector 23 of the FIG. 1 VSB signal receiver. In a modification per FIG. 2, 3, 4 or 5 of the FIG. 1 VSB signal receiver, the DAC 44 is supplied the response of the in-phase synchronous detector 230.

Figure 10:
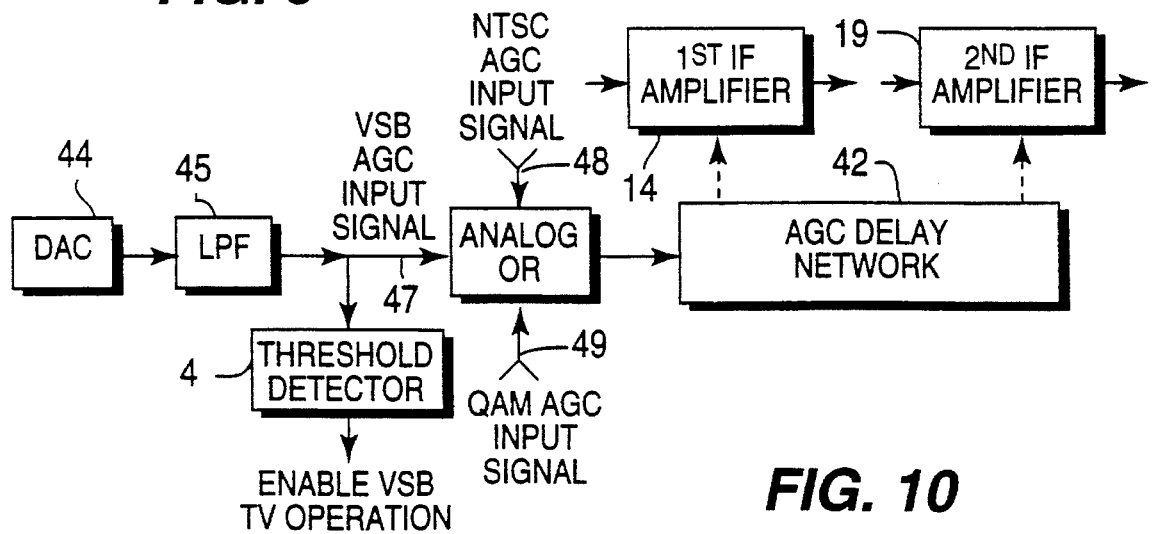
FIG. 10 is a block schematic diagram of a modification that can be made to either of the AGC arrangements of FIGS. 7, 8 or 9 in a television receiver adapted for receiving at least one other type of television signal in addition to the type using a VSB signal encoding digital information in symbol form.

FIG. 10 shows a variation in the way that the response of the lowpass filter 45 is applied to the AGC delay network 42 in a television receiver using the second IF amplifier response as input signal to additional receiver circuitry for NTSC television signals, or as input signal to additional receiver circuitry for HDTV signals on a complex-amplitude-modulation (QAM) carrier, or as input signals to both those types of additional receiver circuitry, besides being used in additional receiver circuitry for VSB HDTV signals. The response of the lowpass filter 45 is applied to a first input 47 an analog OR circuit 46, which receives at least one other input signal. A second input 48 of the analog OR circuit 46 can be supplied AGC input signal either from additional receiver circuitry for NTSC television signals or from additional receiver circuitry for HDTV signals on a complex-amplitude-modulation (QAM) carrier. Alternatively, the second input 48 and a third input 49 of the analog OR circuit 46 can be supplied respective AGC input signals from separate ones of additional receiver circuitry for NTSC television signals and additional receiver circuitry for HDTV signals on a complex-amplitude-modulation (QAM) carrier. The response of the analog OR circuit 46 applied to the AGC delay network 42 as a selected one of the AGC input signals supplied thereto is assumed to respond to the largest of them, as referred to a reference potential for which no reduction in the gains of the first IF amplifier 14 and the second IF amplifier 19 occurs and to which any unused input of the analog OR circuit 46 is returned. Furthermore, in order for reduction in the gains of the IF amplifiers 14 and 19 to occur, the departure from the reference potential of the selected AGC input signal applied to the AGC delay network 4:2 must be of substantial value.

A threshold detector 4 responds to the response of the lowpass filter 45 departing from the reference potential in the sense tending to curtail the gains of the IF amplifiers 14 and 19 by more than a threshold value, which threshold value is much smaller than the substantial value at which the gains are actually curtailed, to generate a signal that enables operation of the television receiver for reproducing the television program transmitted on a VSB carrier selected by the tuner 1.

Figure 11:
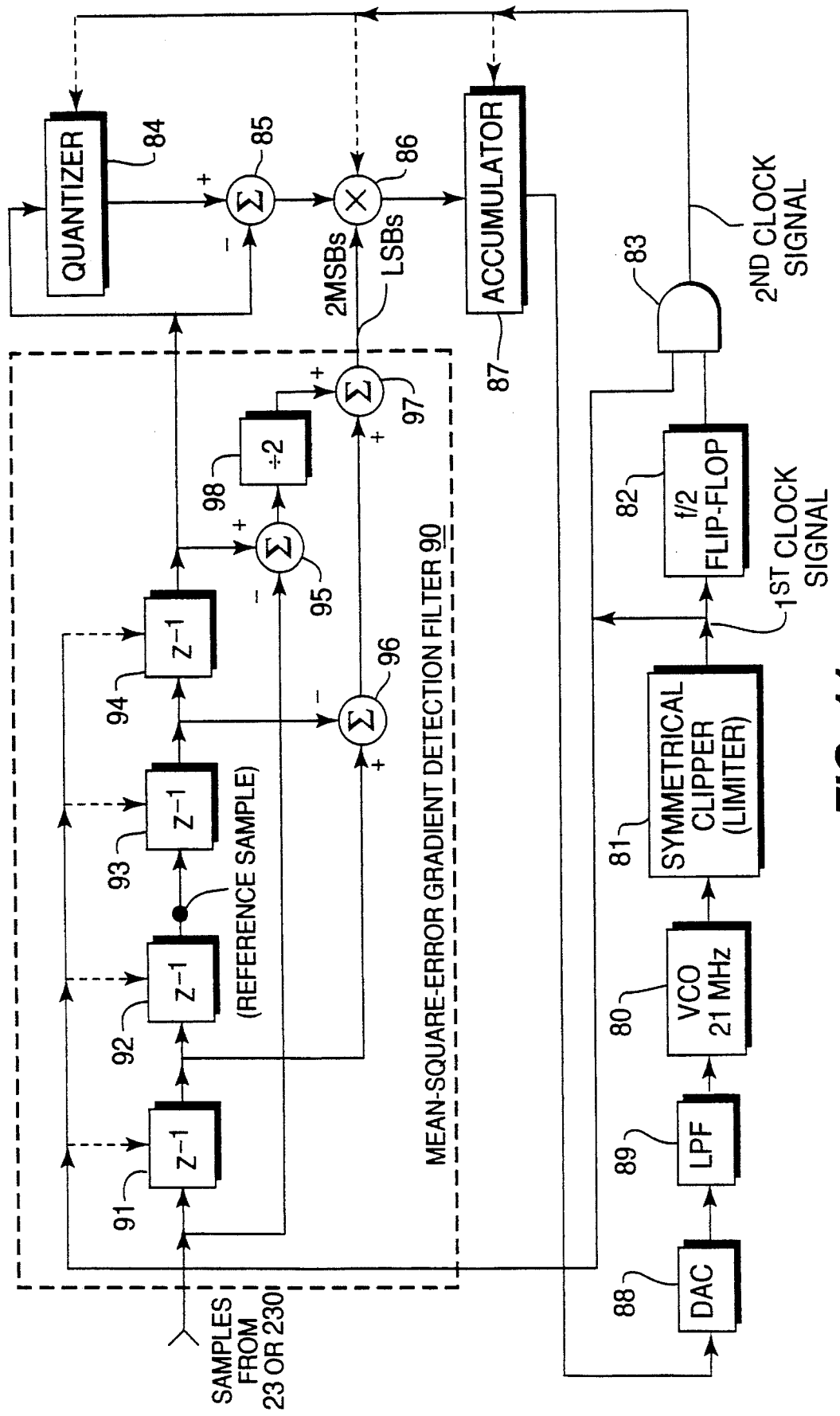
FIG. 11 is a block schematic diagram of decision-directed timing recovery circuitry, as can be included in the FIG. 1 receiver, for sampling VSB signal as downconverted to final intermediate frequencies at a multiple of symbol rate.

FIG. 11 shows decision-directed timing recovery circuitry, which can be included in the FIG. 1 VSB signal receiver for adjusting the frequency and phase of the sampling clock so that the timing of samples during analog-to-digital conversion by the ADC 22 is in temporal alignment with the transmission of symbols on the VSB carrier. The timing recovery circuitry is of the same general type as S. U. H. Qureshi described for use with pulse amplitude modulation (PAM) signals in his paper "Timing Recovery for Equalized Partial-Response Systems, IEEE Transactions on Communications, Dec. 1976, pp. 1326–13330. A voltage-controlled oscillator 80 generates cissoidal oscillations nominally of 21 MHz frequency. The oscillator 80 is preferably a crystal oscillator capable of frequency control over a relatively narrow range. A symmetrical clipper or limiter 81 generates a squarewave response to these cissoidal oscillations, which is used as a first clock signal for timing the sampling of the final IF signal by the ADC 22 as a step in the digitization procedure which follows the initial step of filtering to limit bandwidth. A frequency-divider flip-flop 82 responds to transitions of the first clock signal in a prescribed sense for generating another square wave which an AND circuit 83 ANDs with the first clock signal for generating a second clock signal. The generation of the error signal for controlling the frequency and phase of the cissoidal oscillations generated by the VCO 80 will now be considered.

The samples from the in-phase synchronous detector 23 or 230 are applied as input signal to a mean-square-error gradient detection filter 90. The filter 90 is a finite-impulse-response digital filter having a (−½), 1, 0, (−1), (+½) kernel, the operation of which is clocked by the first sampling clock. The filter 90 includes a cascade connection of clocked latches 91, 92, 93 and 94 and further includes digital adder/subtractors 95, 96 and 97. The digital adder/subtractors 95 and 96 are operated unclocked, but the digital adder/subtractor 97 is operated as a clocked element by including a clocked latch at its output, which is clocked by the first sampling clock. Each of the clocked elements 91–94 and 97 exhibits unit clock delay at the 21 megasample/second clock rate of the first sampling clock that the ADC 22 uses for input sampling. The adder/subtractor 95 is operated as a subtractor, for subtracting the current input sample supplied to the filter 90 from the input sample supplied four sample periods before. The adder/subtractor 96 is operated as a subtractor, for subtracting, from the input sample supplied one sample period earlier than the current one, the input sample supplied three sample periods earlier. The adder/subtractor 97 is operated as an adder, adding to the difference signal from the subtractor 96 one-half the difference signal from the subtractor 95. The sum signal of the adder 97 is supplied as the filter 90 response.

The samples from the in-phase synchronous detector 23 or 230, as delayed by the cascade connection of the clocked latches 91, 92, 93 and 94, are supplied to a quantizer 84, which supplies the quantization level most closely approximated by the sample currently received by the quantizer 84 as input signal. This quantization level has the quantizer 84 input signal subtracted therefrom by a digital adder/subtractor 85, which is operated as a clocked element by including a clocked latch at its output. The filter 90 response is in temporal alignment with the difference signal from the subtractor 85. The difference signal from the subtractor 85 is indicative of the correction required to correct for error in the symbols as detected by the in-phase synchronous detector 23 or 230, but does not indicate whether the error arising from the sampling at the VSB signal receiver 5 being misphased is due to sampling too early or too late in time. A digital multiplier 86 multiplies the difference signal from the subtractor 85 by the filter 90 response to resolve this issue. The sign bit and the next most significant bit of the two's complement sum signal from the adder 97 suffice for the multiplication, which permits simplification of the digital multiplier 86 structure. The product signal from the digital multiplier 86 is supplied to an accumulator 87 for integration, to generate a digital control signal that is converted to an analog control voltage by a digital-to-analog converter 88. A narrowband lowpass filter is used for applying the analog control voltage to the VCO 80.

The digital VSB detection circuitry described herein is attractive for use in a television receiver that is designed to have the capability for receiving HDTV signals on a complex-amplitude-modulation (QAM) carrier. The need for additional receiver circuitry to detect the complex-amplitude-modulation (QAM) carrier is reduced since the DCO and fullband in-phase synchronous detector portions of the digital VSB detection circuitry can also be included in the digital QAM detection circuitry.

What is claimed is:

1. A radio receiver comprising:

a tuner for selecting one of channels at different locations in a frequency band and frequency converting the selected channel to a final intermediate-frequency signal in a final intermediate-frequency band;

an analog-to-digital converter for digitizing said final intermediate-frequency signal to generate as an output signal thereof digitized final intermediate-frequency signal;

a phase tracker operative on narrow-bandpass filtered portions of said digitized final intermediate-frequency signal centering on its carrier frequency, for suppressing an imaginary portion of said final intermediate-frequency signal, arising from phase incoherency in local oscillations used during frequency converting or from multipath distortion, and for supplying digital descriptions of a carrier wave for a real portion of said final intermediate-frequency signal; and a first synchronous detector responsive to said digitized final intermediate-frequency signal for detecting the real portion thereof in accordance with said digital descriptions of the carrier wave for a real portion of said final intermediate-frequency signal, thereby to generate a first synchronous detector output signal.

2. A radio receiver as set forth in claim 1 wherein said phase tracker comprises:

a finite-impulse-response, narrow-bandpass digital filter selectively responsive to said digitized final intermediate-frequency signal for separating the carrier component thereof;

a digitally controlled oscillator, for supplying digital descriptions of a carrier wave for an imaginary portion of said final intermediate-frequency signal, and for supplying said digital descriptions of a carrier wave for a real portion of said final intermediate-frequency signal, the phases of said carrier wave for said real and imaginary portions of said final intermediate-frequency signal being fixed with respect to each other, but the frequency and phases of said carrier wave for said real and imaginary portions of said final intermediate-frequency signal being adjustable responsive to a digital control signal;

a second synchronous detector for generating a quadrature-phase synchronous detection response to the separated carrier component of said digitized final intermediate-frequency signal, in accordance with said digital descriptions of the carrier wave for a imaginary portion of said final intermediate-frequency signal; and a lowpass filter for supplying said digital control signal in response to the quadrature-phase synchronous detection response of said second synchronous detector.

3. A radio receiver as set forth in claim 2 further comprising:

a plurality of successive intermediate-frequency amplifier stages included within said tuner, at least one of which intermediate-frequency amplifier stages provides gain at an intermediate frequency different from said final intermediate-frequency band, at least two of which intermediate-frequency amplifier stages provide gain each in an amount controlled by a respective gain control signal;

means for applying said respective gain control signals, in respective amounts each controlled by an automatic gain control input signal;

means for generating an analog lowpass filtered response to first synchronous detector output signal; and means for supplying said analog lowpass filtered response, at least under selected conditions, to said means for applying said respective gain control signals as said automatic gain control input signal.

4. A radio receiver as set forth in claim 3 wherein said means for applying said respective gain control signals includes an AGC delay network responsive to said automatic gain control input signal for applying said respective gain control signals.

5. A radio receiver as set forth in claim 4 wherein said means for supplying said analog lowpass filtered response, at least under selected conditions, to said means for applying said respective gain control signals as said automatic gain control input signal is of a type that supplies said analog lowpass filtered response under any and all conditions to said AGC delay network as said automatic gain control input signal.

6. A radio receiver as set forth in claim 4 wherein said means for supplying said analog lowpass filtered response, at least under selected conditions, to said means for applying said respective gain control signals as said automatic gain control input signal comprises:

an analog-OR circuit receiving said analog lowpass filtered response as one of plural input signals thereto and supplying said automatic gain control input signal to said means for applying said respective gain control signals.

7. A radio receiver as set forth in claim 2 further comprising:

a plurality of successive intermediate-frequency amplifier stages included within said tuner, at least one of which intermediate-frequency amplifier stages provides gain at an intermediate frequency different from said final intermediate-frequency band, at least two of which intermediate-frequency amplifier stages provide gain each in an amount controlled by a respective gain control signal;

means for applying said respective gain control signals, in respective amounts each controlled by an automatic gain control input signal;

a third synchronous detector for generating an in-phase synchronous detection response to the separated carrier component of said digitized final intermediate-frequency signal, in accordance with said digital descriptions of the carrier wave for a real portion of said final intermediate-frequency signal;

means for generating an analog lowpass filtered response to the in-phase synchronous detection response to the separated carrier component of said digitized final intermediate-frequency signal generated by said third synchronous detector; and means for supplying said analog lowpass filtered response, at least under selected conditions, to said means for applying said respective gain control signals as said automatic gain control input signal.

8. A radio receiver as set forth in claim 7 wherein said means for applying said respective gain control signals includes an AGC delay network responsive to said automatic gain control input signal for applying said respective gain control signals.

9. A radio receiver as set forth in claim 8 wherein said means for supplying said analog lowpass filtered response, at least under selected conditions, to said means for applying said respective gain control signals as said automatic gain control input signal is of a type that supplies said analog lowpass filtered response under any and all conditions to said AGC delay network as said automatic gain control input signal.

10. A radio receiver as set forth in claim 8 wherein said means for supplying said analog lowpass filtered response, at least under selected conditions, to said means for applying said respective gain control signals as said automatic gain control input signal comprises:

an analog-OR circuit receiving said analog lowpass filtered response as one of plural input signals thereto and supplying said automatic gain control input signal to said means for applying said respective gain control signals.

11. A radio receiver as set forth in claim 1 wherein said phase tracker comprises:

a digitally controlled oscillator for generating digitized samples of a cosine wave of a controlled frequency and digitized samples of a sine wave of said controlled frequency, said controlled frequency being controllable over a range of frequencies including the carrier frequency of said final intermediate-frequency signal in response to a digital control signal indicative of the difference of said controlled frequency from a desired frequency.

12. A radio receiver as set forth in claim 11 wherein said phase tracker further comprises:

a finite-impulse-response, first digital filter generating a Hilbert transform response to said digitized final intermediate-frequency signal, as delayed by the latency time of said first digital filter;

a first digital delay line for delaying the digitized final intermediate-frequency signal by a delay equal to the latency time of said first digital filter, thereby to generate a delayed digitized final intermediate-frequency signal;

finite-impulse-response, narrow-bandpass, second and third digital filters having identical response functions centering on the carrier frequency of said final intermediate-frequency signal, said second digital filter in cascade connection after said first digital filter for providing a frequency-selective response to the Hilbert transform of said digitized final intermediate-frequency signal as delayed by the latency time of said first digital filter and as further delayed by the latency time of said second digital filter, said third digital filter in cascade connection after said first digital delay line for providing a frequency-selective response to said delayed digitized final intermediate-frequency signal as further delayed by the latency time of said third digital filter;

a first digital multiplier, receptive of the frequency-selective response of said second digital filter as its multiplicand signal and receptive of the digitized samples of said cosine wave of said controlled frequency as its multiplier signal, for generating a first product signal;

a second digital multiplier, receptive of the frequency-selective response of said third digital filter as its multiplicand signal and receptive of the digitized samples of said sine wave of said controlled frequency as its multiplier signal, for generating a second product signal;

a digital subtractor differentially combining said first and second product signals for generating a difference signal indicative of the departure of the frequency and phase of said controlled frequency from the carrier frequency of said final intermediate-frequency signal; and means responsive to said difference signal for supplying said digital control signal to said digital controlled oscillator.

13. A radio receiver as set forth in claim 12 further comprising:

a second digital delay line for further delaying the delayed digitized final intermediate-frequency signal from said first digital delay line by an additional delay equal to the latency time of said second digital filter, thereby to generate a further-delayed digitized final intermediate-frequency signal;

a third digital delay line for delaying the delayed Hilbert transform response of said first digital filter by an additional delay equal to the latency time of said third digital filter, thereby to generate a further-delayed Hilbert transform of the digitized final intermediate-frequency signal;

a third digital multiplier, receptive of said further-delayed digitized final intermediate-frequency signal as its multiplicand signal and receptive of the digitized samples of said cosine wave of said controlled frequency as its multiplier signal, for generating a third product signal;

a fourth digital multiplier, receptive of said further delayed Hilbert transform of the digitized final intermediate-frequency signal as its multiplicand signal and receptive of the digitized samples of said sine wave of said controlled frequency as its multiplier signal, for generating a fourth product signal; and a digital adder included in said first synchronous detector together with said third and fourth digital multipliers, said digital adder additively combining said third and fourth product signals for generating a sum signal supplied as said first synchronous detector output signal.

14. A radio receiver as set forth in claim 13, further comprising:

a plurality of successive intermediate-frequency amplifier stages included within said tuner, at least one of which intermediate-frequency amplifier stages provides gain at an intermediate frequency different from said final intermediate-frequency band, at least two of which intermediate-frequency amplifier stages provide gain each in an amount controlled by a respective gain control signal;

means for applying said respective gain control signals, in respective amounts each controlled by an automatic gain control input signal;

means for generating an analog lowpass filtered response to said first synchronous detector output signal; and means for supplying said analog lowpass filtered response, at least under selected conditions, to said means for applying said respective gain control signals as said automatic gain control input signal.

15. A radio receiver as set forth in claim 14 wherein said means for applying said respective gain control signals includes an AGC delay network responsive to said automatic gain control input signal for applying said respective gain control signals.

16. A radio receiver as set forth in claim 15 wherein said means for supplying said analog lowpass filtered response, at least under selected conditions, to said means for applying said respective gain control signals as said automatic gain control input signal is of a type that supplies said analog lowpass filtered response under any and all conditions to said AGC delay network as said automatic gain control input signal.

17. A radio receiver as set forth in claim 15 wherein said means for supplying said analog lowpass filtered response, at least under selected conditions, to said means for applying said respective gain control signals as said automatic gain control input signal comprises:

an analog-OR circuit receiving said analog lowpass filtered response as one of plural input signals thereto and supplying said automatic gain control input signal to said means for applying said respective gain control signals.

18. A radio receiver as set forth in claim 12, further comprising:

a plurality of successive intermediate-frequency amplifier stages included within said tuner, at least one of which intermediate-frequency amplifier stages provides gain at an intermediate frequency different from said final intermediate-frequency band, at least two of which intermediate-frequency amplifier stages provide gain each in an amount controlled by a respective gain control signal;

means for applying said respective gain control signals, in respective amounts each controlled by an automatic gain control input signal;

a second synchronous detector for generating a narrowband in-phase synchronous detection response to the separated carrier component of said digitized final intermediate-frequency signal;

means for generating an analog lowpass filtered response to said narrowband in-phase synchronous detection response; and means for supplying said analog lowpass filtered response, at least under selected conditions, to said means for applying said respective gain control signals as said automatic gain control input signal—wherein said second synchronous signal detector comprises:

a third digital multiplier, receptive of the frequency-selective response of said second digital filter as its multiplicand signal and receptive of the digitized samples of said cosine wave of said controlled frequency as its multiplier signal, for generating a third product signal;

a fourth digital multiplier, receptive of the frequency-selective response of said third digital filter as its multiplicand signal and receptive of the digitized samples of said sine wave of said controlled frequency as its multiplier signal, for generating a fourth product signal; and a digital adder for additively combining said third and fourth product signals for generating a sum signal, supplied as said narrowband in-phase synchronous detection response to said means for generating an analog lowpass filtered response to said narrowband in-phase synchronous detection response.

19. A radio receiver as set forth in claim 18 wherein said means for applying said respective gain control signals includes an AGC delay network responsive to said automatic gain control input signal for applying said respective gain control signals.

20. A radio receiver as set forth in claim 19 wherein said means for supplying said analog lowpass filtered response, at least under selected conditions, to said means for applying said respective gain control signals as said automatic gain control input signal is of a type that supplies said analog lowpass filtered response under any and all conditions to said AGC delay network as said automatic gain control input signal.

21. A radio receiver as set forth in claim 19 wherein said means for supplying said analog lowpass filtered response, at least under selected conditions, to said means for applying said respective gain control signals as said automatic gain control input signal comprises:

an analog-OR circuit receiving said analog lowpass filtered response as one of plural input signals thereto and supplying said automatic gain control input signal to said means for applying said respective gain control signals.

22. A radio receiver as set forth in claim 11 wherein said phase tracker further comprises:

a finite-impulse-response, narrow-bandpass, first digital filter receiving said digitized final intermediate-frequency signal from said analog-to-digital converter and providing after a latency time for said first digital filter a frequency-selective response to portions of said digitized final intermediate-frequency signal centering on its carrier frequency;

a finite-impulse-response, second digital filter, responding to the frequency-selective response of said first digital filter to generate a response of said second digital filter which is the Hilbert transform of the frequency-selective response of said first digital filter, as delayed by the latency time of said second digital filter;

a first digital delay line for delaying the frequency-selective response of said first digital filter by a delay equal to the latency time of said second digital filter, thereby to generate a first digital delay line response;

a first digital multiplier, receptive of the response of said second digital filter as its multiplicand signal and receptive of the digitized samples of said cosine wave of said controlled frequency as its multiplier signal, for generating a first product signal;

a second digital multiplier, receptive of the response of said first digital delay line as its multiplicand signal and receptive of the digitized samples of said sine wave of said controlled frequency as its multiplier signal, for generating a second product signal;

a digital subtractor differentially combining said first and second product signals for generating a difference signal indicative of the departure of the frequency and phase of said controlled frequency from the carrier frequency of said final intermediate-frequency signal, said digital subtractor combining with said first and second digital multipliers to provide a second synchronous detector responsive to an imaginary portion of said digitalized final intermediate frequency signal; and means responsive to said difference signal for supplying said digital control signal to said digital controlled oscillator.

23. A radio receiver as set forth in claim 22 further comprising:

a second digital delay line for delaying the digitized final intermediate-frequency signal by a delay equal to the latency time of said first digital filter, thereby to generate a delayed digitized final intermediate-frequency signal;

a finite-impulse-response, third digital filter, responding to said delayed digitized final intermediate-frequency signal to generate a response of said third digital filter which is the Hilbert transform of said delayed digitized final intermediate-frequency signal, as further delayed by the latency time of said third digital filter;

a third digital delay line for further delaying the delayed digitized final intermediate-frequency signal from said second digital delay line by an additional delay equal to the latency times of said third digital filter, thereby to generate a further-delayed digitized final intermediate-frequency signal;

a third digital multiplier, receptive of said further-delayed digitized final intermediate-frequency signal from said third digital delay line as its muitiplicand signal and receptive of the digitized samples of said cosine wave of said controlled frequency as its multiplier signal, for generating a third product signal;

a fourth digital multiplier, receptive of the response of said third digital filter as its multiplicand signal and receptive of the digitized samples of said sine wave of said controlled frequency as its multiplier signal, for generating a fourth product signal;

a digital adder included in said first synchronous detector together with said third and fourth digital multipliers, said digital adder additively combining said third and fourth product signals for generating a sum signal supplied as said first synchronous detector output signal.

24. A radio receiver as set forth in claim 23, further comprising:

a plurality of successive intermediate-frequency amplifier stages included within said tuner, at least one of which intermediate-frequency amplifier stages provides gain at an intermediate frequency different from said final intermediate-frequency band, at least two of which intermediate-frequency amplifier stages provide gain each in an amount controlled by a respective gain control signal;

means for applying said respective gain control signals, in respective amounts each controlled by an automatic gain control input signal;

means for generating an analog lowpass filtered response to said first synchronous detector output signal; and means for supplying said analog lowpass filtered response, at least under selected conditions, to said means for applying said respective gain control signals as said automatic gain control input signal.

25. A radio receiver as set forth in claim 24 wherein said means for applying said respective gain control signals includes an AGC delay network responsive to said automatic gain control input signal for applying said respective gain control signals.

26. A radio receiver as set forth in claim 25 wherein said means for supplying said analog lowpass filtered response, at least under selected conditions, to said means for applying said respective gain control signals as said automatic gain control input signal is of a type that supplies said analog lowpass filtered response under any and all conditions to said AGC delay network as said automatic gain control input signal.

27. A radio receiver as set forth in claim 25 wherein said means for supplying said analog lowpass filtered response, at least under selected conditions, to said means for applying said respective gain control signals as said automatic gain control input signal comprises:

an analog-OR circuit receiving said analog lowpass filtered response as one of plural input signals thereto and supplying said automatic gain control input signal to said means for applying said respective gain control signals.

28. A radio receiver as set forth in claim 23 further comprising:

a plurality of successive intermediate-frequency amplifier stages included within said tuner, at least one of which intermediate-frequency amplifier stages provides gain at an intermediate frequency different from said final intermediate-frequency band, at least two of which intermediate-frequency amplifier stages provide gain each in an amount controlled by a respective gain control signal;

means for applying said respective gain control signals, in respective amounts each controlled by an automatic gain control input signal;

a third synchronous detector for generating a narrowband in-phase synchronous detection response to the separated carrier component of said digitized final intermediate-frequency signal;

means for generating an analog lowpass filtered response to said narrowband in-phase synchronous detection response; and means for supplying said analog lowpass filtered response, at least under selected conditions, to said means for applying said respective gain control signals as said automatic gain control input signal—wherein said third synchronous detector comprises:

a third digital multiplier, receptive of said first digital delay line response as its multiplicand signal and receptive of the digitized samples of said cosine wave of said controlled frequency as its multiplier signal, for generating a third product signal;

a fourth digital multiplier, receptive of the response of said second digital filter as its multiplicand signal and receptive of the digitized samples of said sine wave of said controlled frequency as its multiplier signal, for generating a fourth product signal; and a digital adder for additively combining said third and fourth product signals for generating a sum signal, supplied as said narrowband in-phase synchronous detection response to said means for generating an analog lowpass filtered response to said narrowband in-phase synchronous detection response.

29. A radio receiver as set forth in claim 28 wherein said means for applying said respective gain control signals includes an AGC delay network responsive to said automatic gain control input signal for applying said respective gain control signals.

30. A radio receiver as set forth in claim 29 wherein said means for supplying said analog lowpass filtered response, at least under selected conditions, to said means for applying said respective gain control signals as said automatic gain control input signal is of a type that supplies said analog lowpass filtered response under any and all conditions to said AGC delay network as said automatic gain control input signal.

31. A radio receiver as set forth in claim 29 wherein said means for supplying said analog lowpass filtered response, at least under selected conditions, to said means for applying said respective gain control signals as said automatic gain control input signal comprises:

an analog-OR circuit receiving said analog lowpass filtered response as one of plural input signals thereto and supplying said automatic gain control input signal to said means for applying said respective gain control signals.

32. A radio receiver as set forth in claim 11 wherein said phase tracker further comprises:

a finite-impulse-response, first digital filter generating a Hilbert transform response to said digitized final intermediate-frequency signal, as delayed by the latency time of said first digital filter;

a digital delay line for delaying the digitized final intermediate-frequency signal by a delay equal to the latency time of said first digital filter, thereby to generate a delayed digitized final intermediate-frequency signal;

a first digital multiplier, receptive of the Hilbert transform response of said first digital filter as its multiplicand signal and receptive of the digitized samples of said cosine wave of said controlled frequency as its multiplier signal, for generating a first product signal;

a second digital multiplier, receptive of said delayed digitized final intermediate-frequency signal from said digital delay line as its multiplicand signal and receptive of the digitized samples of said sine wave of said controlled frequency as its multiplier signal, for generating a second product signal;

a digital subtractor differentially combining said first and second product signals for generating a difference signal;

a second digital filter generating a lowpass response to said difference signal, said lowpass response being indicative of the departure of the frequency and phase of said controlled frequency from the carrier frequency of said final intermediate-frequency signal; and means responsive to said lowpass response for supplying said digital control signal to said digital controlled oscillator.

33. A radio receiver as set forth in claim 32 wherein said first synchronous detector comprises:

a third digital multiplier, receptive of said delayed digitized final intermediate-frequency signal from said digital delay line as its multiplicand signal and receptive of the digitized samples of said cosine wave of said controlled frequency as its multiplier signal, for generating a third product signal;

a fourth digital multiplier, receptive of the Hilbert transform response of said first digital filter as its multiplicand signal and receptive of the digitized samples of said sine wave of said controlled frequency as its multiplier signal, for generating a fourth product signal; and a digital adder included in said first synchronous detector together with said third and fourth digital multipliers, said digital adder additively combining said third and fourth product signals for generating a sum signal supplied as said first synchronous detector output signal.

34. A radio receiver as set forth in claim 33, further comprising:

a plurality of successive intermediate-frequency amplifier stages included within said tuner, at least one of which intermediate-frequency amplifier stages provides gain at an intermediate frequency different from said final intermediate-frequency band, at least two of which intermediate-frequency amplifier stages provide gain each in an amount controlled by a respective gain control signal;

means for applying said respective gain control signals, in respective amounts each controlled by an automatic gain control input signal;

means for generating an analog lowpass filtered response to said first synchronous detector output signal; and means for supplying said analog lowpass filtered response, at least under selected conditions, to said means for applying said respective gain control signals as said automatic gain control input signal.

35. A radio receiver as set forth in claim 34 wherein said means for applying said respective gain control signals includes an AGC delay network responsive to said automatic gain control input signal for applying said respective gain control signals.

36. A radio receiver as set forth in claim 35 wherein said means for supplying said analog lowpass filtered response, at least under selected conditions, to said means for applying said respective gain control signals as said automatic gain control input signal is of a type that supplies said analog lowpass filtered response under any and all conditions to said AGC delay network as said automatic gain control input signal.

37. A radio receiver as set forth in claim 35 wherein said means for supplying said analog lowpass filtered response, at least under selected conditions, to said means for applying said respective gain control signals as said automatic gain control input signal comprises:

an analog-OR circuit receiving said analog lowpass filtered response as one of plural input signals thereto and supplying said automatic gain control input signal to said means for applying said respective gain control signals.

38. A radio receiver as set forth in claim 1 wherein said phase tracker comprises:

a digitally controlled oscillator for generating digitized samples of a cosine wave of a controlled frequency, digitized samples of a sine wave of said controlled frequency, digitized samples of a wave of said controlled frequency advanced in phase from said cosine wave of said controlled frequency by a prescribed angle, and digitized samples of a wave of said controlled frequency advanced in phase from said sine wave of said controlled frequency by said prescribed angle, said controlled frequency being controllable over a range of frequencies including the carrier frequency of said final intermediate-frequency signal in response to a digital control signal indicative of the difference of said controlled frequency from a desired frequency.

39. A radio receiver as set forth in claim 38 wherein said phase tracker further comprises:

a finite-impulse-response, first digital filter generating a Hilbert transform response to said digitized final intermediate-frequency signal, as delayed by the latency time of said first digital filter;

a first digital delay line for delaying the digitized final intermediate-frequency signal by a delay equal to the latency time of said first digital filter, thereby to generate a delayed digitized final intermediate-frequency signal;

finite-impulse-response, narrow-bandpass, second and third digital filters having identical response functions centering on the carrier frequency of said final intermediate-frequency signal, said second digital filter in cascade connection after said first digital filter for providing a frequency-selective response to the Hilbert transform of said digitized final intermediate-frequency signal as delayed by the latency time of said first digital filter and as further delayed by the latency time of said second digital filter, said third digital filter in cascade connection after said first digital delay line for providing a frequency-selective response to said delayed digitized final intermediate-frequency signal as further delayed by the latency time of said third digital filter;

a first digital multiplier, receptive of the frequency-selective response of said second digital filter as its multiplicand signal and receptive of the digitized samples of said cosine wave of said controlled frequency by a prescribed angle as its multiplier signal, for generating a first product signal;

a second digital multiplier, receptive of the frequency-selective response of said third digital filter as its multiplicand signal and receptive of the digitized samples of said sine wave of said controlled frequency as its multiplier signal by said prescribed angle, for generating a second product signal;

a digital subtractor differentially combining said first and second product signals for generating a difference signal indicative of the departure of the frequency and phase of said controlled frequency from the carrier frequency of said final intermediate-frequency signal; and means responsive to said difference signal for supplying said digital control signal to said digital controlled oscillator.

40. A radio receiver as set forth in claim 39 wherein said first synchronous detector comprises:

a third digital multiplier, receptive of said delayed digitized final intermediate-frequency signal from said digital delay line as its multiplicand signal and receptive of the digitized samples of said wave of said controlled frequency advanced in phase from said cosine wave of said controlled frequency as its multiplier signal, for generating a third product signal;

a fourth digital multiplier, receptive of the Hilbert transform response of said first digital filter as its multiplicand signal and receptive of the digitized samples of said wave of said controlled frequency advanced in phase from said sine wave of said controlled frequency as its multiplier signal, for generating a fourth product signal; and a digital adder included in said first synchronous detector together with said third and fourth digital multipliers, said digital adder additively combining said third and fourth product signals for generating a sum signal supplied as said first synchronous detector output signal.

41. A radio receiver as set forth in claim 40, further comprising:

a plurality of successive intermediate-frequency amplifier stages included within said tuner, at least one of which intermediate-frequency amplifier stages provides gain at an intermediate frequency different from said final intermediate-frequency band, at least two of which intermediate-frequency amplifier stages provide gain each in an amount controlled by a respective gain control signal;

means for applying said respective gain control signals, in respective amounts each controlled by an automatic gain control input signal;

means for generating an analog lowpass filtered response to said first synchronous detector output signal; and means for supplying said analog lowpass filtered response, at least under selected conditions, to said means for applying said respective gain control signals as said automatic gain control input signal.

42. A radio receiver as set forth in claim 41 wherein said means for applying said respective gain control signals includes an AGC delay network responsive to said automatic gain control input signal for applying said respective gain control signals.

43. A radio receiver as set forth in claim 42 wherein said means for supplying said analog lowpass filtered response, at least under selected conditions, to said means for applying said respective gain control signals as said automatic gain control input signal is of a type that supplies said analog lowpass filtered response under any and all conditions to said AGC delay network as said automatic gain control input signal.

44. A radio receiver as set forth in claim 42 wherein said means for supplying said analog lowpass filtered response, at least under selected conditions, to said means for applying said respective gain control signals as said automatic gain control input signal comprises:

an analog-OR circuit receiving said analog lowpass filtered response as one of plural input signals thereto and supplying said automatic gain control input signal to said means for applying said respective gain control signals.

45. A radio receiver as set forth in claim 39 further comprising:

a plurality of successive intermediate-frequency amplifier stages included within said tuner, at least one of which intermediate-frequency amplifier stages provides gain at an intermediate frequency different from said final intermediate-frequency band, at least two of which intermediate-frequency amplifier stages provide gain each in an amount controlled by a respective gain control signal;

means for applying said respective gain control signals, in respective amounts each controlled by an automatic gain control input signal;

a second synchronous detector for generating a narrowband in-phase synchronous detection response to the separated carrier component of said digitized final intermediate-frequency signal;

means for generating an analog lowpass filtered response to said narrowband in-phase synchronous detection response; and means for supplying said analog lowpass filtered response, at least under selected conditions, to said means for applying said respective gain control signals as said automatic gain control input signal— wherein said second synchronous detector comprises:

a third digital multiplier receptive of the frequency-selective response of said second digital filter as its multiplicand signal and receptive of the digitized samples of said cosine wave of said controlled frequency as its multiplier signal, for generating a third product signal;

a fourth digital multiplier, receptive of the frequency-selective response of said third digital filter as its multiplicand signal and receptive of the digitized samples of said sine wave of said controlled frequency as its multiplier signal, for generating a fourth product signal; and a digital adder for additively combining said third and fourth product signals for generating a sum signal, supplied as said narrowband in-phase synchronous detection response to said means for generating an analog lowpass filtered response to said narrowband in-phase synchronous detection response.

46. A radio receiver as set forth in claim 45 wherein said means for applying said respective gain control signals includes an AGC delay network responsive to said automatic gain control input signal for applying said respective gain control signals.

47. A radio receiver as set forth in claim 46 wherein said means for supplying said analog lowpass filtered response, at least under selected conditions, to said means for applying said respective gain control signals as said automatic gain control input signal is of a type that supplies said analog lowpass filtered response under any and all conditions to said AGC delay network as said automatic gain control input signal.

48. A radio receiver as set forth in claim 46 wherein said means for supplying said analog lowpass filtered response, at least under selected conditions, to said means for applying said respective gain control signals as said automatic gain control input signal comprises:

an analog-OR circuit receiving said analog lowpass filtered response as one of plural input signals thereto and supplying said automatic gain control input signal to said means for applying said respective gain control signals.

* * * * *